(12) United States Patent
Kelly

(10) Patent No.: US 10,302,249 B1
(45) Date of Patent: May 28, 2019

(54) SPEED STRUT CLAMP

(71) Applicant: Voytas Inc., Syracuse, NY (US)

(72) Inventor: Michael T. Kelly, Syracuse, NY (US)

(73) Assignee: Voytas Inc., Syracuse, NY (US)

( * ) Notice: Subject to any disclaimer, the term of this patent is extended or adjusted under 35 U.S.C. 154(b) by 53 days.

(21) Appl. No.: 15/640,998

(22) Filed: Jul. 3, 2017

Related U.S. Application Data

(60) Provisional application No. 62/493,543, filed on Jul. 8, 2016.

(51) Int. Cl.
| | |
|---|---|
| B25B 1/02 | (2006.01) |
| F16M 13/02 | (2006.01) |
| F16B 2/12 | (2006.01) |
| F16L 3/133 | (2006.01) |
| B23D 45/02 | (2006.01) |
| B25H 1/00 | (2006.01) |
| B25H 1/02 | (2006.01) |
| F16H 25/20 | (2006.01) |
| F16H 19/06 | (2006.01) |

(52) U.S. Cl.
CPC ......... *F16M 13/022* (2013.01); *B23D 45/021* (2013.01); *B25H 1/0028* (2013.01); *B25H 1/02* (2013.01); *F16B 2/12* (2013.01); *F16H 19/06* (2013.01); *F16H 25/20* (2013.01); *F16L 3/133* (2013.01); *F16H 2019/0686* (2013.01); *F16H 2025/204* (2013.01)

(58) Field of Classification Search
CPC .. F16M 13/022; B23D 45/021; B25H 1/0028; B25H 1/02; F16B 2/12; F16H 19/06; F16H 25/20; F16H 3/13; F16H 2025/204; B25B 1/02; B25B 1/08; B25B 1/14; B25B 5/00; B25B 5/082; B25B 5/08
USPC .............................. 269/43, 71, 246, 166, 6, 3
See application file for complete search history.

(56) References Cited

U.S. PATENT DOCUMENTS

| | | | | | |
|---|---|---|---|---|---|
| 884,772 | A | * | 4/1908 | Sorensen ................... | F16B 2/12 |
| | | | | | 16/252 |
| 2,568,233 | A | * | 9/1951 | Hamilton ................ | B25B 5/003 |
| | | | | | 248/228.1 |
| 3,096,110 | A | * | 7/1963 | Cantor ...................... | E04G 7/14 |
| | | | | | 403/385 |
| 3,449,992 | A | * | 6/1969 | Hanaway ............. | B23D 45/006 |
| | | | | | 30/92 |
| 3,465,995 | A | * | 9/1969 | Whitman .................. | B25B 5/08 |
| | | | | | 248/228.3 |
| 3,469,810 | A | * | 9/1969 | Dorris ....................... | F16B 2/12 |
| | | | | | 24/525 |

(Continued)

*Primary Examiner* — George B Nguyen
(74) *Attorney, Agent, or Firm* — Maine Cernota & Rardin

(57) ABSTRACT

A strut channel clamp includes a block that can be positioned anywhere along the length of the strut channel. In embodiments, the stop can be repositioned to any of a plurality of locations along the channel. In certain embodiments, the stop and block can be placed on different surfaces of the strut channel. In some embodiments, a threaded shaft engaged with the block imparts force against the stop, and in some of these embodiments the shaft can be disengaged quickly from the block and repositioned longitudinally without rotation thereof. In various embodiments, the stop and/or block are constructed partly or entirely from common, off-the-shelf strut channel accessories. In embodiments, the block is rotatable.

15 Claims, 47 Drawing Sheets

(56) References Cited

U.S. PATENT DOCUMENTS

| | | | | |
|---|---|---|---|---|
| 4,704,829 A | * | 11/1987 | Baumker, Jr. | E04B 7/022 |
| | | | | 269/43 |
| 5,477,598 A | * | 12/1995 | Borner, Jr. | B25B 27/0035 |
| | | | | 254/10.5 |
| 5,527,016 A | * | 6/1996 | Wilkerson, Jr. | E04F 11/1804 |
| | | | | 182/113 |
| 5,722,649 A | | 3/1998 | Morris | |
| 5,898,974 A | | 5/1999 | Boyer | |
| 6,394,438 B1 | * | 5/2002 | Glaser | B25B 1/103 |
| | | | | 269/282 |
| 6,431,534 B1 | * | 8/2002 | Orosz | B25B 5/101 |
| | | | | 269/249 |
| 6,550,128 B1 | * | 4/2003 | Lorenz | E21B 19/155 |
| | | | | 166/77.51 |
| 6,622,976 B1 | * | 9/2003 | Ianello | F16L 3/13 |
| | | | | 248/71 |
| 7,421,768 B2 | * | 9/2008 | Chiang | B25B 11/02 |
| | | | | 269/43 |
| 8,210,510 B2 | * | 7/2012 | Li | B25B 1/103 |
| | | | | 269/246 |
| 8,991,802 B1 | * | 3/2015 | Southworth | B66F 19/00 |
| | | | | 269/43 |
| 9,393,089 B1 | * | 7/2016 | Al-Shehri | F16B 2/065 |
| 2001/0050456 A1 | * | 12/2001 | Wallis | B25B 5/145 |
| | | | | 269/43 |
| 2002/0101017 A1 | * | 8/2002 | Kolarik | B25B 27/10 |
| | | | | 269/43 |
| 2003/0042662 A1 | * | 3/2003 | Ternel | B25B 5/006 |
| | | | | 269/43 |
| 2008/0023608 A1 | * | 1/2008 | Hsieh | A47F 5/0853 |
| | | | | 248/307 |
| 2012/0219354 A1 | * | 8/2012 | Bauer | F16B 2/12 |
| | | | | 403/187 |
| 2018/0107094 A1 | * | 4/2018 | Yowler | G03B 15/02 |

* cited by examiner

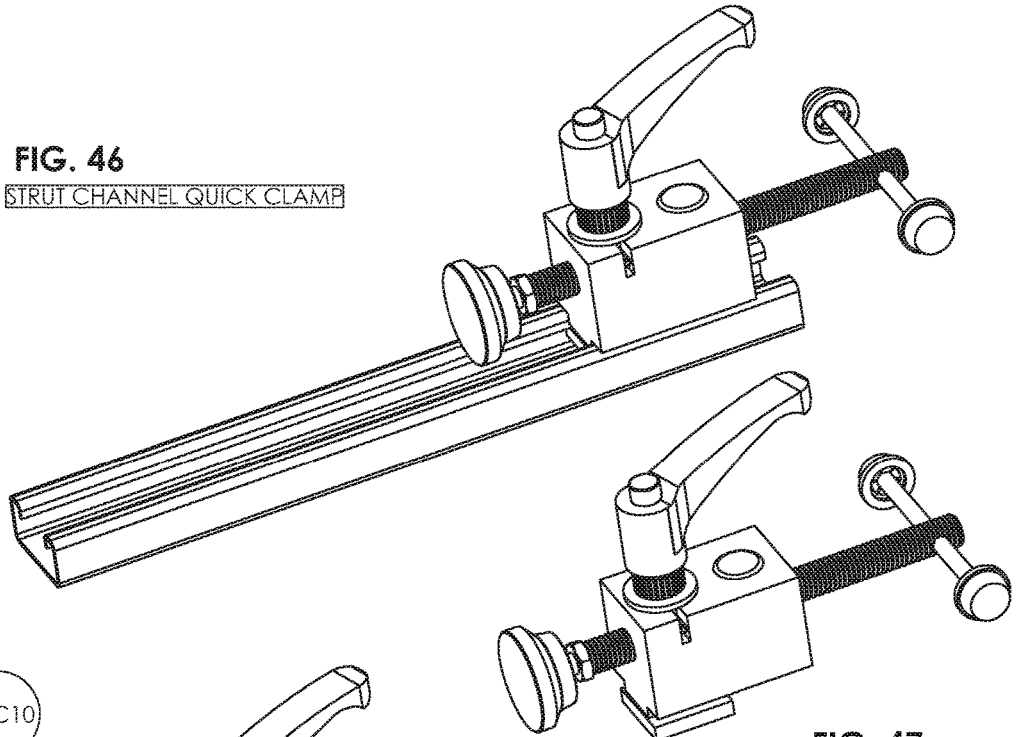
FIG. 46
STRUT CHANNEL QUICK CLAMP
FIG. 47
STRUT QUICK CLAMP
(STRUT CHANNEL NOT SHOWN)
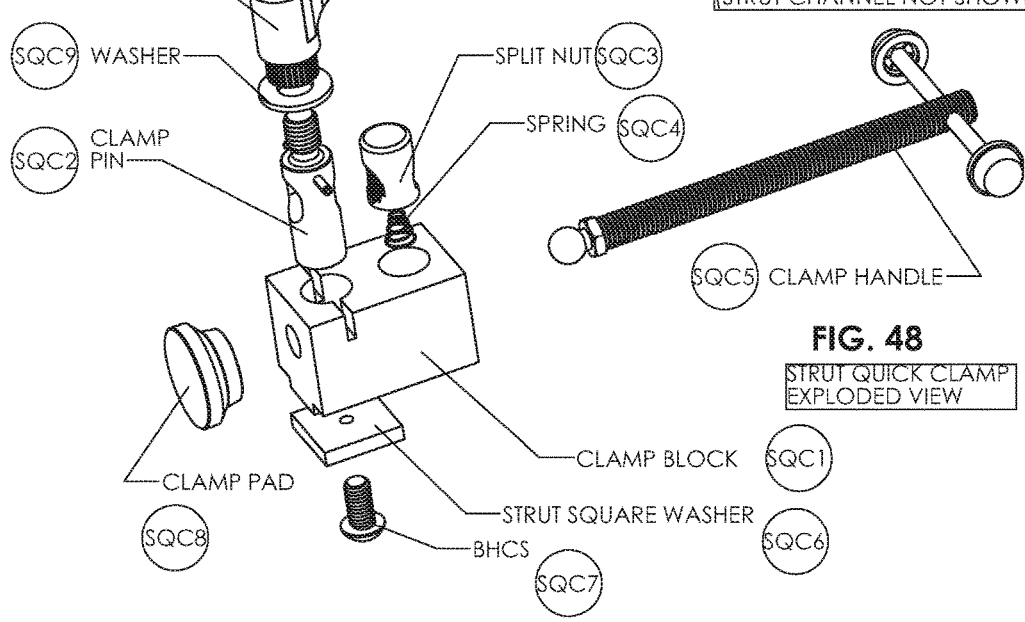
FIG. 48
STRUT QUICK CLAMP
EXPLODED VIEW

STRUT QUICK CLAMP
ERGO HANDLE

SQC14

STRUT QUICK CLAMP
POST HANDLE

VARIATIONS OF CLAMP PIN

ACTUATOR USING STRUT CHANNEL

ACTUATOR WITH EXPLODED DRIVE END VIEW

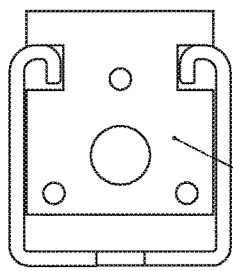
FIG. 72A
END VIEW
OF CARRIAGE
INSIDE STRUT CHANNEL
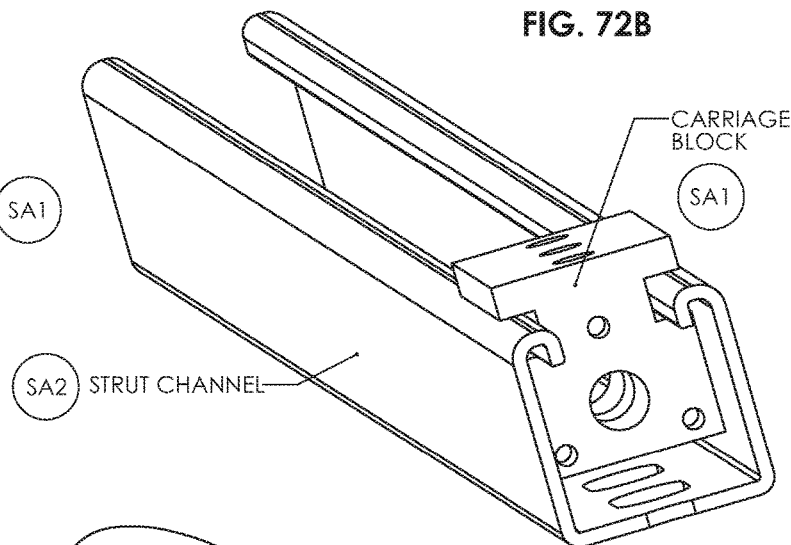
FIG. 72B
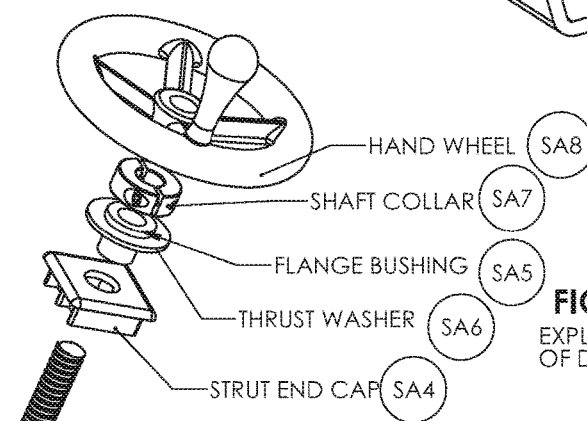
FIG. 73
EXPLODED VIEW
OF DRIVE END
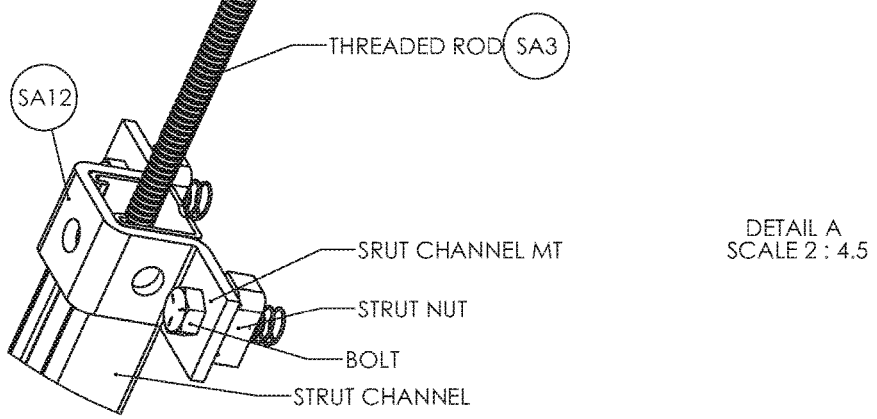
DETAIL A
SCALE 2 : 4.5

DUAL CARRIAGE
WITH SELF CENTERING
CARRIAGE TRAVEL

HEX NUT DRIVE

ZERO BACK LASH NUT DRIVE

TAPPED CARRIAGE BLOCK

BELT DRIVEN LINEAR ACTUATOR

STRUT PANEL SAW

DETAIL OF COUNTER BALANCE

DETAIL A
SCALE 1 : 3

SAW CARRIAGE DETAIL

DETAIL B
SCALE 1 : 6

SAW CARRIAGE DETAIL

PANNEL SUPPORT ROLLER ASSEMBLY

DETAIL C
SCALE 1 : 4

PANNEL SUPPORT ROLLER ASSEMBLY

DETAIL OF FOLDING BENCH BRACE

DETAIL B
SCALE 1 : 4

SPEED STRUT CLAMP

RELATED APPLICATIONS

This application claims the benefit of U.S. Provisional Application No. 62/493,543, filed Jul. 8, 2016, which is herein incorporated by reference in its entirety for all purposes.

FIELD OF THE INVENTION

The invention relates to mechanical clamps, and more particularly, to mechanical clamps that are mounted to a structural member.

BACKGROUND OF THE INVENTION

Strut channels are standardized structural elements that used in the construction and electrical industries for light structural support, often for supporting wiring, plumbing, or mechanical components such as air conditioning or ventilation systems.

With reference to FIGS. 1 and 2, a strut channel is usually formed from metal sheet, folded over into an open channel shape with inward-curving edges to provide additional stiffness and as a location to mount interconnecting components. Struts can also be constructed from fiberglass. Struts usually have holes of some sort in their bases, to facilitate interconnection or fastening of the struts to underlying building structures.

An important advantage of using standardized strut channels in construction is that there are many options available for rapidly and easily connecting struts together, and for connecting other items to the strut channels, using various specialized, strut-specific fasteners and bolts. This allows struts to be assembled into a desired structure very rapidly, with minimal tools, and with only moderately trained labor, thereby reducing costs significantly for many applications. Typically, a strut channel can also be modified or added onto relatively easily if needed. The only alternative to strut channel for most applications is custom fabrication using steel bar stock and other commodity components, requiring welding or extensive drilling and bolting, which has none of the above advantages.

In additional to permanent structures such as wiring, plumbing, air conditioning, and ventilation systems, strut channels are also used to construct temporary structures such as "jigs" that are useful for supporting other structures during their construction and assembly, after which the jigs are removed and disassembled so that the components can be re-used for other applications. In such cases, it is often desirable to interconnect the struts using "strut clamps" that are relatively more expensive but much easier and less time consuming to use, as compared to the low-cost fasteners and bolts typically used in construction of permanent strut-based structures.

Typically, a strut clamp includes a compression jaw and an anvil jaw that are arranged in an opposing relationship with each other. The compression jaw is usually located at an end of a strut, and is typically mounted to a force-creating component, which can be guided by and/or mounted to a variety of materials having a variety of shapes. In many clamps, the force-creating component is a screw that is manually rotated to advance the compression jaw toward the anvil jaw, so as to impart a force on the object to be clamped, which is transmitted from the object to the anvil jaw. Note that the anvil jaw is also referred to herein as the "clamp stop," while the compression jaw and the components that impart the force to the said compression jaw is also referred to herein as the "clamp block."

Unfortunately, traditional clamps used for interconnecting structural members such as strut channels suffer from several deficiencies. Typically, the clamp block is rigid and fixed at an end of a structural member, and is not free to move along the structural member. The clamp block is typically threaded to a pipe that is fastened, pinned or ultimately welded to the structural member.

Also, known clamp blocks and clamp stops are typically complex, and require advanced manufacturing techniques to construct, and the number of clamp blocks and clamp stops that can be attached to a given structural member is very limited. In addition, structural members to which clamps are attached are typically dedicated to the function of the clamp and cannot be easily used in other applications, due to the fastening or welding of the clamp components to the said structural member and/or structural changes made to the structural member itself to accommodate the clamps. As a result, other structural members and/or additional accessories are not easily attached to the clamp structure, which limits the function of the strut clamp.

Known strut claims also set a lower-limit on the cross-sectional size of the strut channels with which they are compatible, typically requiring U-shaped channels of the larger variety, because smaller or more shallow U-shaped channels do not provide sufficient cross-sectional area for attachment of known clamp designs.

What is needed, therefore, is a strut channel clamp that can be easily and flexibly positioned along a structural member, can be used with structural members of smaller cross-section, and does not require permanent attachment to a channel strut or other structural member.

SUMMARY OF THE INVENTION

The present invention is a structural member clamp having compression and anvil jaws that can be flexibly located anywhere along the structural member, can be used with structural members of smaller cross-section, and does not require permanent attachment to a channel strut or other structural member. In embodiments, the compression and anvil jaws can be attached to any of a plurality of surfaces of the structural member.

Embodiments of the present invention are compatible for use with commercially available strut channels and other structural members. In particular, strut channels that are compatible for use with embodiments of the invention are highly versatile, relatively inexpensive, and can often be cut to desired lengths with a hack saw. Because embodiments of the invention do not require any customization of the strut channel, expensive machine tools are not required. Examples of strut channels that are compatible with embodiments of the present invention include, but are not limited to, struts marketed under the trade names Unistrut, B-Line, and Superstrut, manufactured by Atkore International, Eaton and Thomas Betts respectively. Embodiments are similarly compatible with strut channel accessories that are commonly available for purchase.

A primary advantage of the present invention is the ability to position the clamp block and clamp stop anywhere on the strut channel. Embodiments take advantage of the fact that the open side of a typical strut channel, herein referred to as the strut channel top, provides an endless adjustment slot. The side opposite the open side of the strut channel, referred to herein as the strut channel bottom, is typically penetrated by either slots or holes. Embodiments have the advantage of locating to these features on the bottom of the strut channel.

In embodiments, the components that make up the disclosed clamp can be created using accessories that are offered by the suppliers of standard strut channels. These include angle brackets, splice plates and channel nuts, which are common products offered by strut channel suppliers. By incorporating such "standard" items into embodiments of the present invention, the disclosed clamp blocks and clamp stops can be used to construct specialized assembly jigs and fixtures.

Furthermore, the strut channel clamps used in embodiments of the invention are not restricted in location to the primary junctions of a bar clamp, but with the addition of strut channel angle brackets and splice plates, can be used to locate complex work pieces in the fields of both wood and metal fabrication.

In a first general aspect of the invention, the clamp block has a threaded post that is the component that produces the clamping force onto the work piece. The threaded post has a T-shaped feature in which a post slides inside the threaded rod in a direction that is perpendicular to the longitudinal axis of the threaded rod. A so-called "quick nut" feature, when pressed, releases the threaded engagement of the threaded post with the clamp block. In embodiments, the quick nut is configured as disclosed in U.S. Pat. No. 5,898,974.

In embodiments, the body of the clamp block that supports and guides the threaded post has a flat bottom, and is secured to the strut channel using a clamp pin that has a slot large enough to allow the threaded rod to pass through it. The clamp pin has threaded features on the ends of it. One of the ends is engageable with a lock handle, while the other end secures a rounded channel nut, so that turning the lock handle secures and locates the clamp block to the strut channel. With the clamp block rigidly located to the strut channel, the threaded rod is still able to move freely, allowing the clamping action to take place. Because the bottom of the clamp block body is flat, the entire clamp block is capable of rotating 360 degrees about the axis of the said clamp pin. And in some embodiments the end of the threaded rod that is closest to the work piece includes a pivoting pad or a clamp stop that allows sliding along the strut channel.

In embodiments, the clamp stop is rigidly secured to the channel, or to an accessory purchased, for example, from a strut channel supplier. The strut accessory used as a clamp stop can take the form of an angle bracket as discussed below, or can have other shapes, depending on the clamping requirement.

The present invention is a clamp configured for operation while attached to an elongated structural member having a uniform cross sectional shape along its longitudinal axis. The clamp includes a clamp stop fixed to the structural member, the clamp stop including a stop surface at its proximal end that is substantially perpendicular to the longitudinal axis of the structural member; and a clamp block assembly. The clamp block assembly includes a clamp housing slidably fixed to the structural member by an attachment mechanism that can be engaged to fix the clamp housing in place and disengaged to allow the clamp housing to slide along the longitudinal axis of the structural member while remaining attached thereto; a passage provided in the clamp housing and engaged with a shaft, so that the shaft is longitudinally fixed to the clamp housing when engaged therewith, but can be disengaged or otherwise manipulated for advancement and retraction through the passage; and a block surface fixed to a distal end of the shaft and substantially perpendicular to the longitudinal axis of the structural member, so that the block surface is in an opposed, parallel relationship to the stop surface when the shaft is parallel to the longitudinal axis of the structural member and the block surface is directed toward the clamp stop.

In embodiments, the shaft is engaged with the passage by a ratchet or pawl mechanism.

In any of the above embodiments, the shaft can be a threaded shaft and the passage can be a threaded passage, so that the shaft can be advanced and retracted through the threaded passage by rotation and counter-rotation of the threaded shaft, respectively.

In some of these embodiments, the threaded passage is elongated and threaded over only a partial circumference thereof, so that the threaded shaft can be disengaged from the threaded passage by a temporary, vertical displacement of the threaded passage, thereby allowing the threaded shaft to slide freely through the threaded passage.

In any of the above embodiments, the block housing can be configured so as to be rotatable about the attachment mechanism when the attachment mechanism is disengaged.

In any of the above embodiments, a location of attachment of the clamp stop to the structural member can be selected from among a plurality of available attachment locations on the structural member.

In any of the above embodiments, the structural member can be a strut channel having a cross sectional shape that includes a horizontal, flat bottom and vertical sides, the vertical sides having upper ends that extend horizontally inward without reaching a center thereof and then vertically downward without reaching the bottom, thereby forming an interior that is vertically open in a central region thereof but vertically blocked at both left and right sides thereof.

In some of these embodiments, the attachment mechanism can include a channel member that is inserted within the interior of the strut channel, said channel member being sufficiently wide to prevent vertical removal thereof while allowing the channel member to slide along the longitudinal axis of the strut channel; a threaded hole formed in a central region of the channel member; and a threaded rod, screw, or bolt that is engaged with the block housing and with the threaded hole in the channel member, so that tightening of the threaded rod, screw, or bolt causes the channel member to be pressed against the channel strut and to be frictionally fixed thereto.

In any of these embodiments, the block housing can extend into the central region of the strut channel, thereby maintaining an alignment between the block housing and the longitudinal axis of the strut channel.

In any of these embodiments, the block housing can extends downward along an outer surface of at least one of the sides of the strut channel, thereby maintaining an alignment between the block housing and the longitudinal axis of the strut channel.

In any of these embodiments, the strut channel can be included in a product line of strut channels and other components that further includes accessories for interconnection of the strut channels in the product line.

In some of these embodiments, the clamp stop is a right-angle L-bracket selected from among the accessories included in the product line, the right-angle bracket being attached by at least one bolt or screw to at least one of a plurality of regularly spaced holes provided in the bottom of the strut channel.

In any of these embodiments, the block housing can include a pair of longitudinally spaced-apart L-brackets selected from among the accessories included in the product line and an engagement member that is penetrated by the passage, the engagement member begin sandwiched between upright ends of the spaced-apart L-brackets.

And in some of these embodiments the shaft is a threaded shaft and the engagement member is a quick nut, the threaded passage being elongated and threaded over only a partial circumference thereof, so that the threaded shaft can be disengaged from the threaded passage by a temporary, vertical displacement of the threaded passage, thereby allowing the threaded shaft to slide freely through the threaded passage.

In any of the above embodiments, the clamp block can be configured to position the shaft above the open central region of the strut channel, or the clamp block can be configured to position the shaft beside one of the sides of the strut channel.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 46 is a complete strut channel/"T" slot extrusion quick clamp mounted on a strut channel;

FIG. 47 shows the quick clamp of FIG. 46 without the strut channel;

FIG. 48 shows an exploded view of the quick clamp of FIG. 47;

FIGS. 72B and 72B show the relationship of the carriage block (SA1) and the strut channel (SA2) of the actuator of FIG. 70;

FIG. 73 is shows a detail view of the bearing assembly typical of the ends of the strut channel;

DETAILED DESCRIPTION

Figure 1:
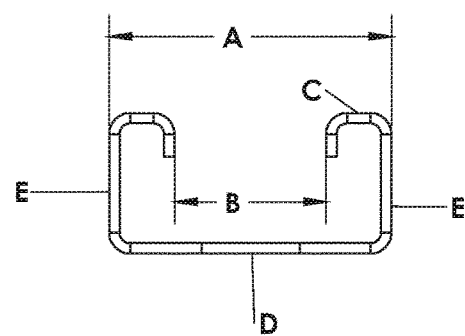
FIG. 1 is an end view of a strut channel compatible with embodiments of the present invention.
Figure 2:
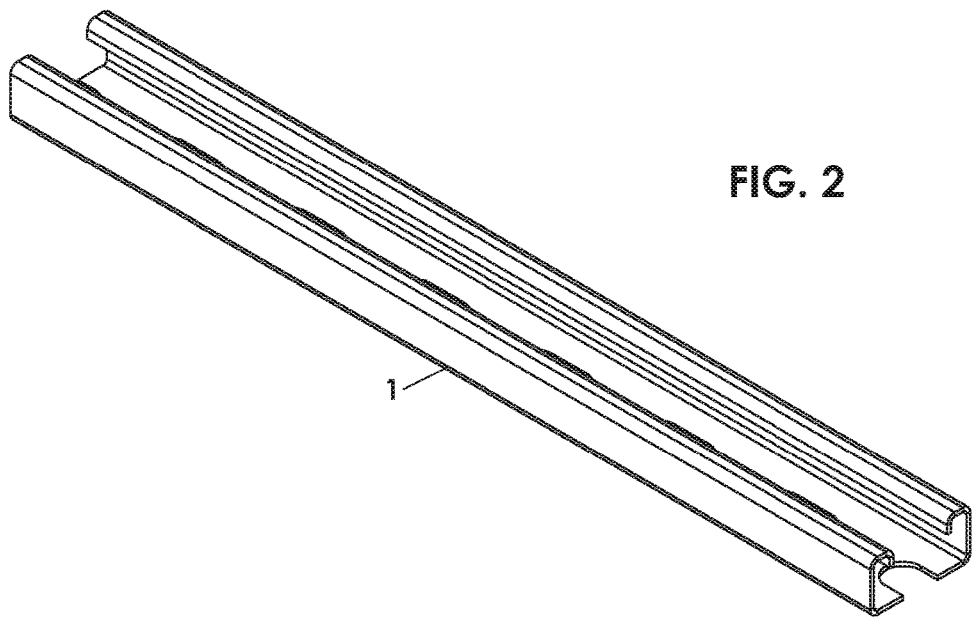
FIG. 2 is a perspective view of the channel of FIG. 1.
Figure 16:
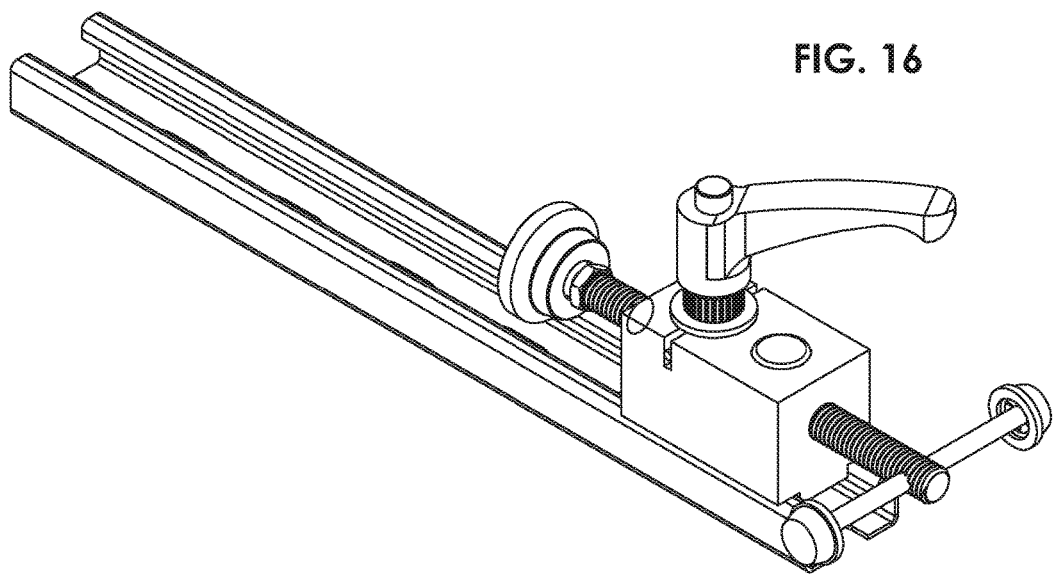
FIG. 16 is a perspective view of an embodiment that has a swivel pad that presses onto a threaded post, and is guided along the gap of FIG. 1.
Figure 23:
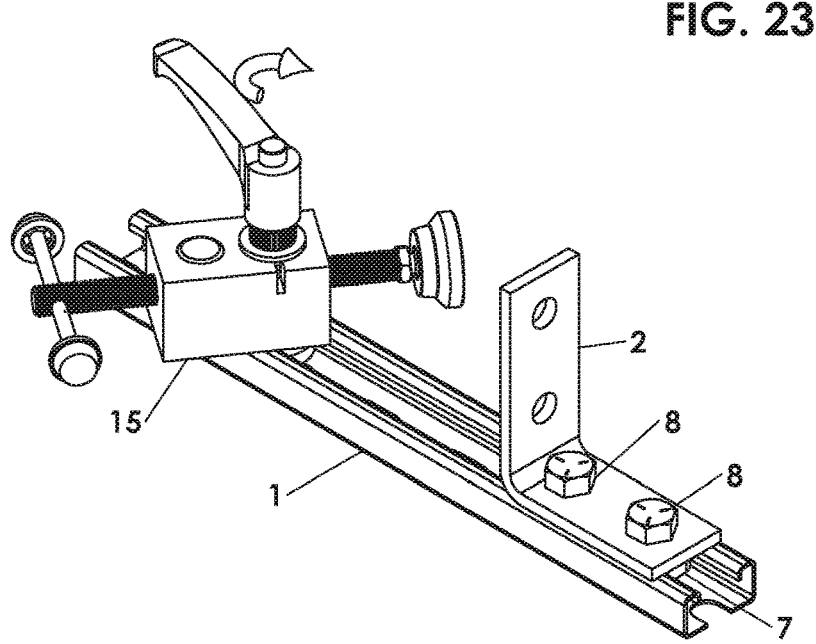
FIG. 23 is a perspective view of an embodiment with a flat bottom clamp block that slides along surface C of FIG. 1 and can rotate 360 degrees.

FIG. 23 displays the preferred embodiment of the first general aspect of the invention. In this view, the clamp housing 15 is shown having a flat bottom. In this configuration, the preferred embodiment clamps the mounting surface C as displayed in FIG. 1. This view demonstrates the ability of the clamp block to rotate 360 degrees along the strut channel 1. It should be noted that the clamp housing 15 also has other features that relates to the bottom flange that allow it to be positioned on the strut channel. These are described in FIG. 16 and FIG. 18. The areas that identify the claimed mounting surface of FIG. 16 and FIG. 18, as shown in FIG. 1, are B and A respectively. The clamp stop 2 in this view is an off the shelf strut channel accessory. It is fastened to the strut channel using cap screws 8 and strut channel nuts 7. The clamp stop 2 can easily be positioned anywhere on the strut channel by tightening or untightening screws 8.

Figure 24:
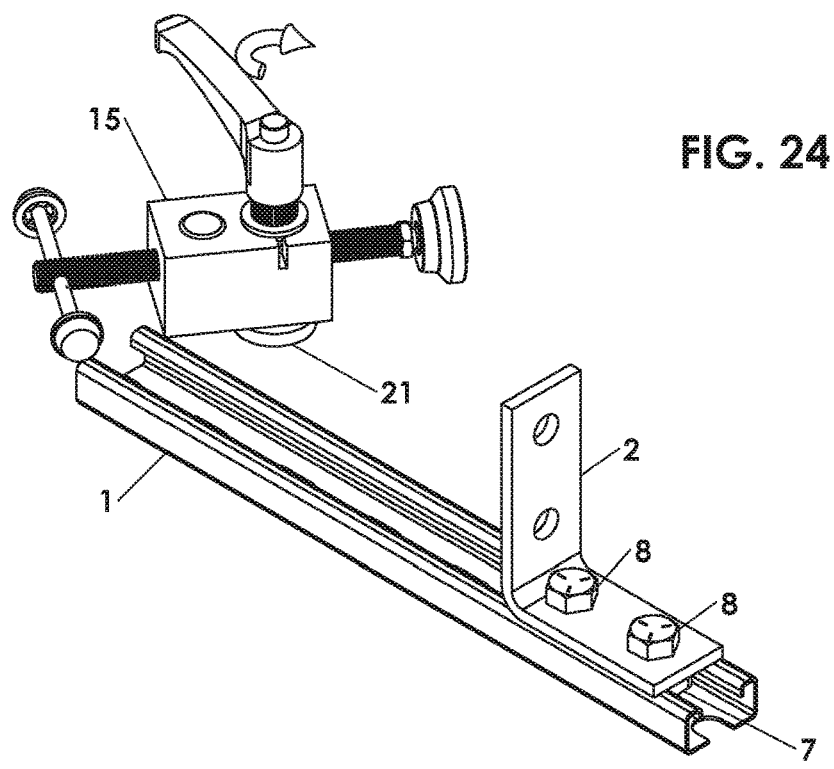
FIG. 24 is a partial exploded view of the embodiment of FIG. 23.
Figure 25:
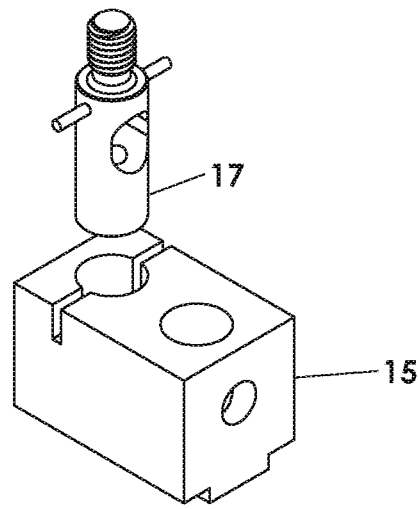
FIG. 25 is a perspective view showing the non-rotating configuration of the clamp pin in an embodiment that includes a small dowel pin pressed into the clamp pin.
Figure 26:
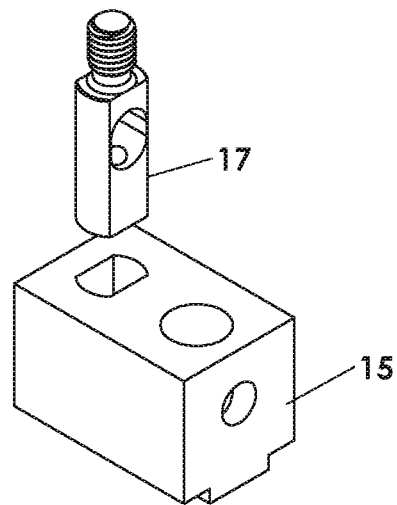
FIG. 26 is a perspective view of a non-rotating configuration of the clamp pin in an embodiment where the clamp pin has flats and slides inside a hole with the same geometry.
Figure 27:
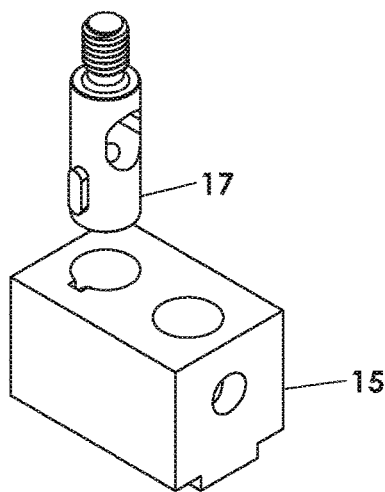
FIG. 27 is a perspective view of the non-rotating configuration of the clamp pin in an embodiment where the clamp pin has a key and the key is guided by the keyway in the clamp block.
Figure 28:
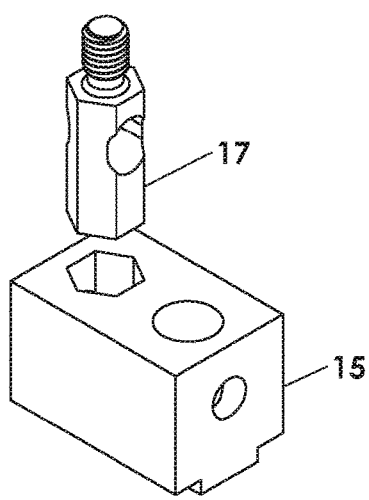
FIG. 28 is a perspective view of the non-rotating configuration of the clamp pin in an embodiment where the clamp pin has a polygon shape.

FIG. 24 is a partially exploded view showing the clamp block lifted away from the strut channel 1. The round strut channel washer 21 is viewed for clarity. This feature helps to secure the clamp in position on the strut channel and because of the round shape, it enables the clamp block to rotate 360 degrees.

Figure 17:
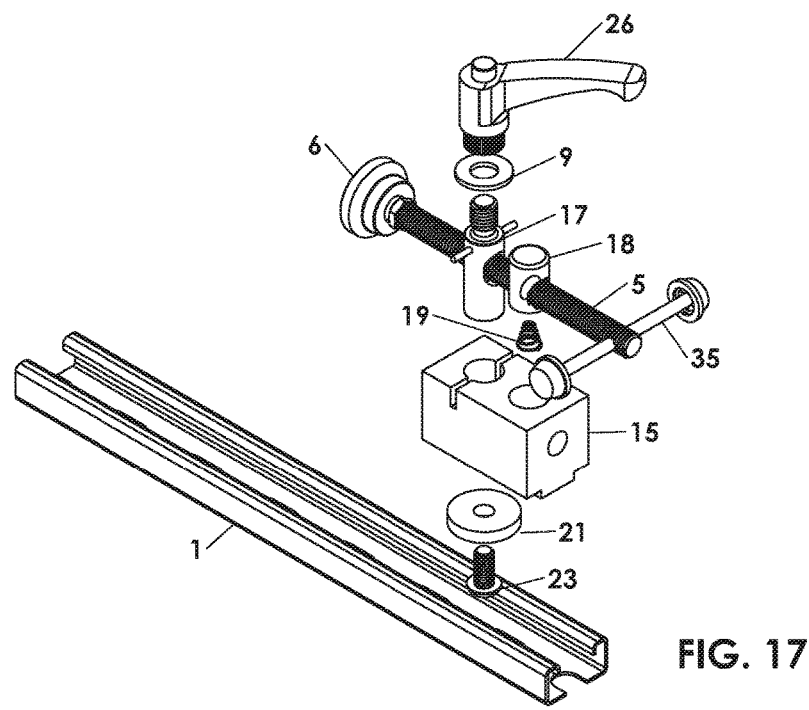
FIG. 17 is an exploded view of the embodiment of FIG. 16.

FIG. 17 shows an exploded view of the clamp block. The clamp housing 15 is the main body of the clamp housing. It has two holes in it. One hole passes through the clamp housing. This hole is for the securing the clamp block to the strut channel. The clamp pin 17 is secured to the round strut washer 21 using a button head cap screw 23. The clamp pin 17 has a slot in it that allows the pass through of the threaded post 5. The clamp pin 17 has a pin through it. This pin keeps the slot in line with the threaded post 5. FIG. 25-28 displays other methods to prohibit the rotation of clamp pin 17. A lock handle 26 is threaded on the top end of the clamp pin 17. The assembly of 23, 21, 17, 9, 26 is what secures the clamp housing 15 in position on the strut channel. When the lock handle 26 is tightened, it draws up the round strut washer 21 up against the inside of the strut channel.

The second hole of the clamp housing 15 does not pass through the block. It is a blind bore hole, meaning that it is only partially through the clamp block. The bottom of this hole is used as a spring seat for the spring 19. This spring exerts a force on the split nut 18. The split nut has an elongated hole. Half the hole has a threaded section while the other has a smooth section. This split nut was adapted from a quick nut described in U.S. Pat. No. 5,898,974. The spring forces the engagement of the threaded portion of the split nut 18 against the threaded post 5. Pushing the spit nut down against the spring pushes the thread portion away from the threaded post 5. This allows the threaded post 5 to be pushed or pulled through the clamp housing 15 along the length of the clamp housing 15. The threaded post T bar 35 is free to slide through a hole in the threaded post 5. This allows the turning of the threaded post 5 anywhere along the strut channel as it will not be hindered by strut channel below it. The end of threaded post 5 has a swivel cap pressed onto it. This provides the contact surface on the work piece. This ball joint design provides a non-marring feature that will not damage the work piece to be clamped.

Figure 18:
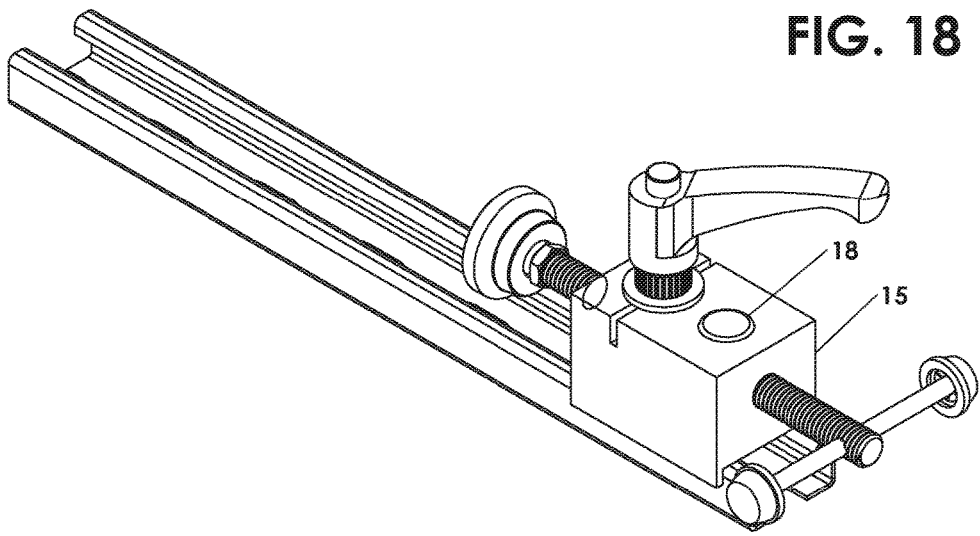
FIG. 18 is a perspective view of an embodiment without the stop block that has a swivel pad that presses onto a threaded post and has a quick release feature that allows quick advancement of the clamp's thread post.
Figure 19:
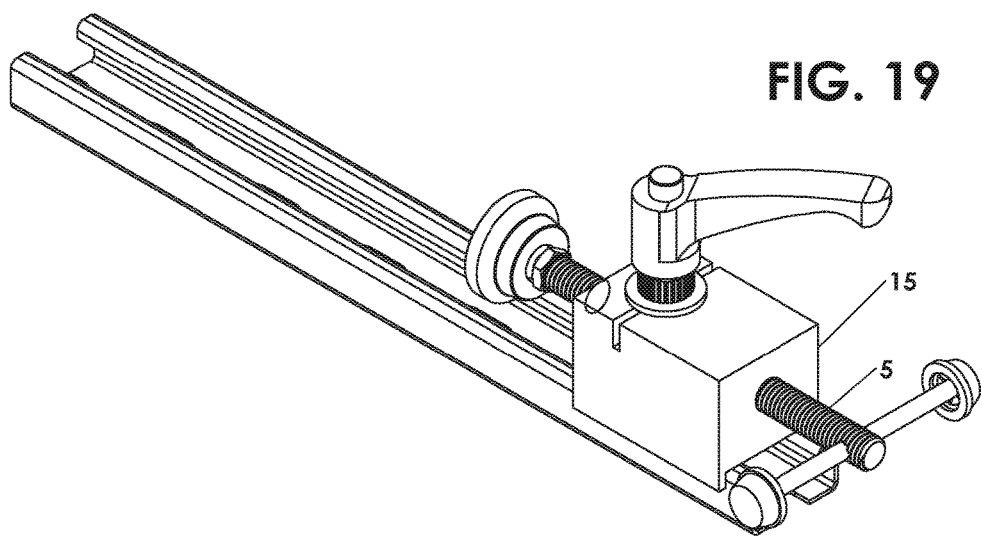
FIG. 19 is a perspective view of and embodiment without the stop block that has a swivel pad that presses onto a threaded post and is guided along the outside surface of the channel of FIG. 1.

FIG. 19 illustrates an embodiment similar to FIG. 18 having a clamp block 15 threaded to match the threaded post 5. The split nut 18 is not used in this embodiment, and in this configuration the clamp block 15 is attached to surface A of FIG. 1.

Figure 20:
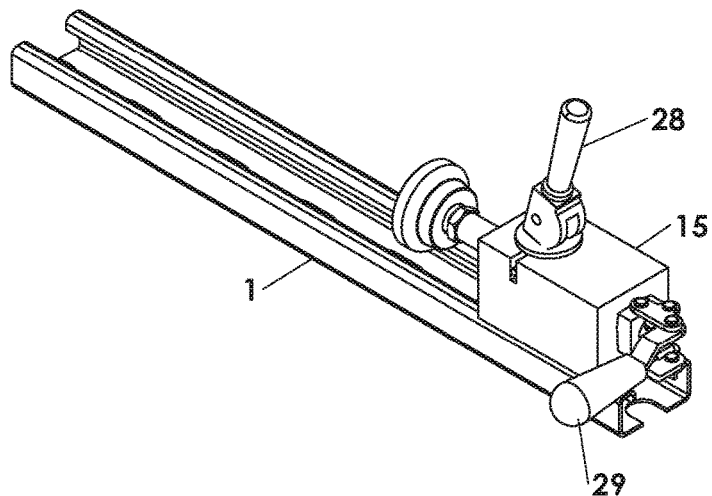
FIG. 20 is a perspective view of an embodiment without the stop block that has a swivel pad that presses onto a threaded post, that is guided along the outside surface of the channel of FIG. 1, and has a toggle mechanism to impart a force to the work to be clamped.

FIG. 20 illustrates an embodiment having a clamp block 15 that includes a flat bottom that mounts to the surface C of FIG. 1. This embodiment uses a cam lever 28 to secure the clamp block 15 to the strut channel 1. The force producing member of the clamp in this version incorporates a toggle lever mechanism 29.

Figure 21:
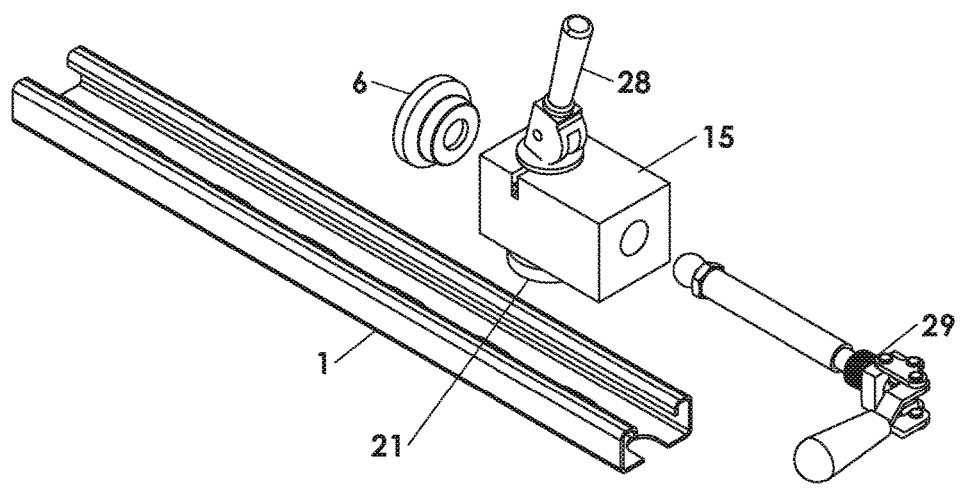
FIG. 21 is an exploded view of the embodiment of FIG. 20

FIG. 21 is a partially exploded view of FIG. 20. The toggle lever 29 snaps onto swivel pad 6. The toggle lever is push or pulled through a through hole in clamp block 15. The cam lever 28 pulls up on the round strut washer 21 locking the clamp block 15 in place against the strut channel 1.

Figure 22:
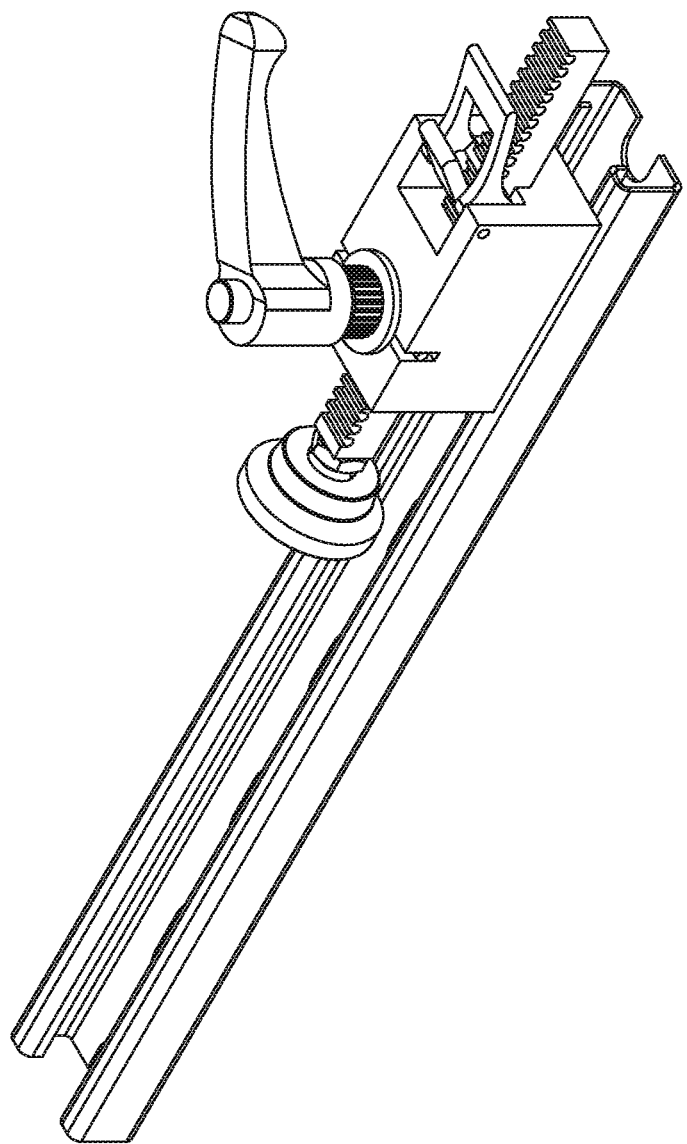
FIG. 22 is a perspective view of an embodiment having a flat bottom clamp block that slides along surface C of FIG. 1 and creates force using a ratchet/pawl mechanism.

FIG. 22 illustrates an embodiment that includes a ratchet/pawl mechanism to produce the clamping force.

Figure 3:
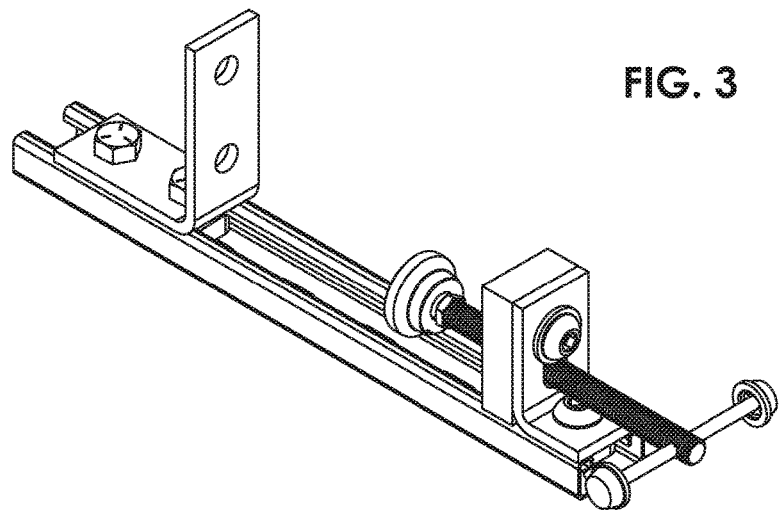
FIG. 3 is a perspective view of a strut clamp in an embodiment of the invention that incorporates a plurality of standard angle brackets supplied by a strut channel manufacturer.
Figure 5:
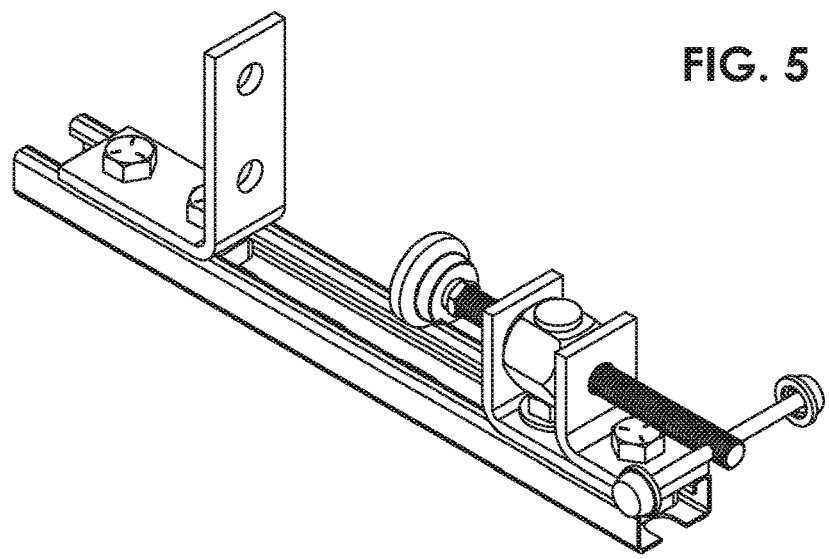
FIG. 5 is a perspective view of a bar clamp in an embodiment similar to FIG. 3, but also including a quick nut that is used as a quick release/advance mechanism.

FIG. 3 and FIG. 5 are additional embodiments using strut channel accessories to manufacture clamp blocks.

Figure 4:
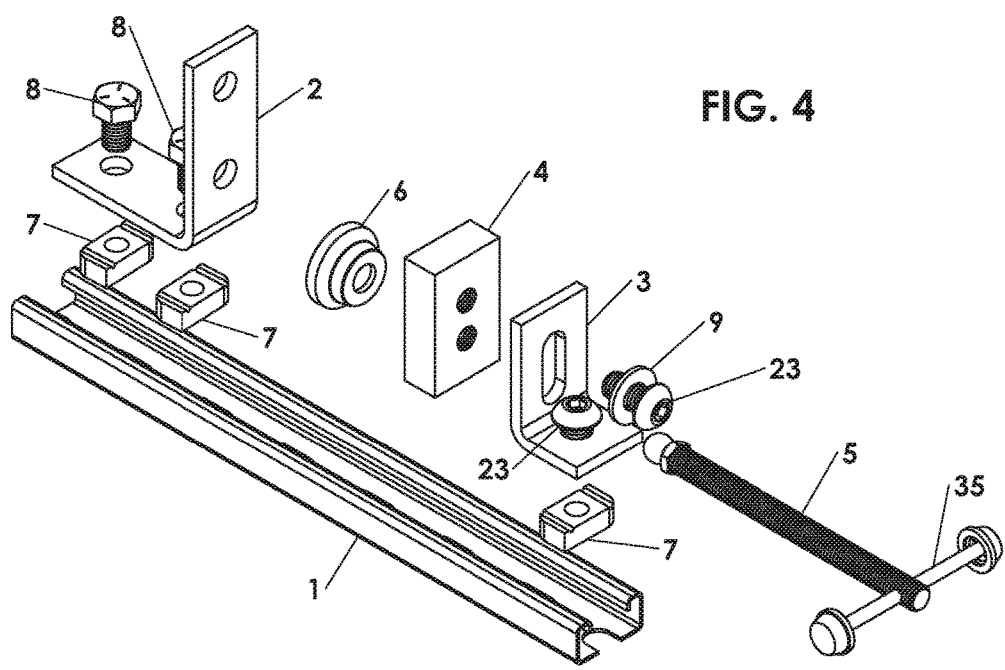
FIG. 4 is an exploded view of the strut clamp of FIG. 3.

FIG. 4 is an exploded view of embodiment displayed in FIG. 3. This embodiment is the least expensive of the embodiments and requires the least customized parts. Like the preferred embodiment, the clamp stop is composed of strut angle bracket 2 and is secured to the strut channel 1 using cap screw 8 and strut nuts 7. The clamp block encompasses a purchased strut angle bracket 3 that has a slot on one leg. A threaded block 4 is fastened to the strut angle bracket 3 using a button head cap screw 23 and washer 9 in one of the threaded holes. The other threaded hole is for the threading of the threaded post 5. This assembly is attached to the strut channel using a button head screw 23. The threaded post 5 has the swivel pad 6 pressed on one end and the T bar 35 freely located in a hole on the other end of threaded post 5.

Figure 6:
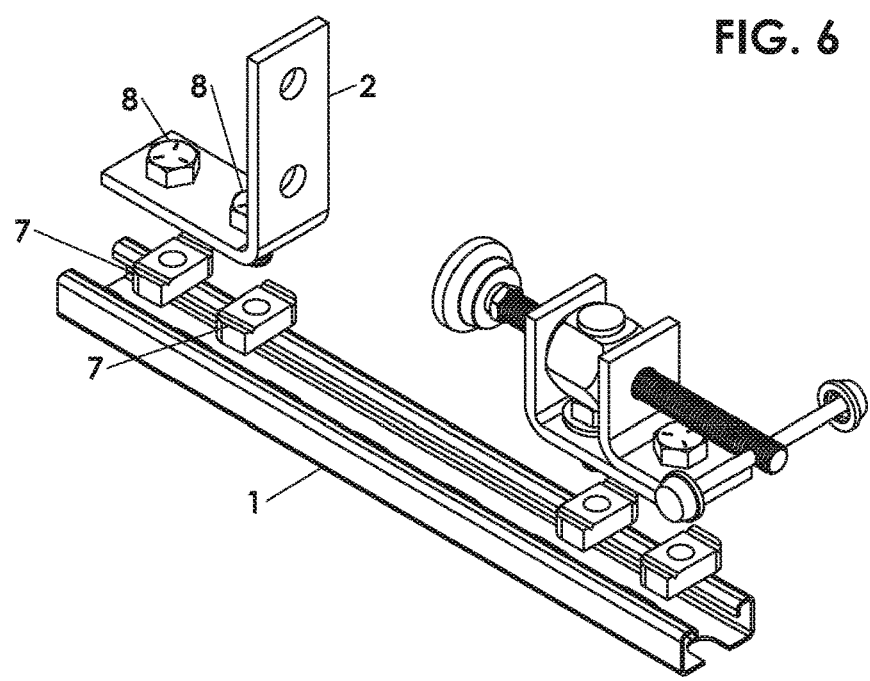
FIG. 6 is a partial exploded view of the clamp of FIG. 5.
Figure 7:
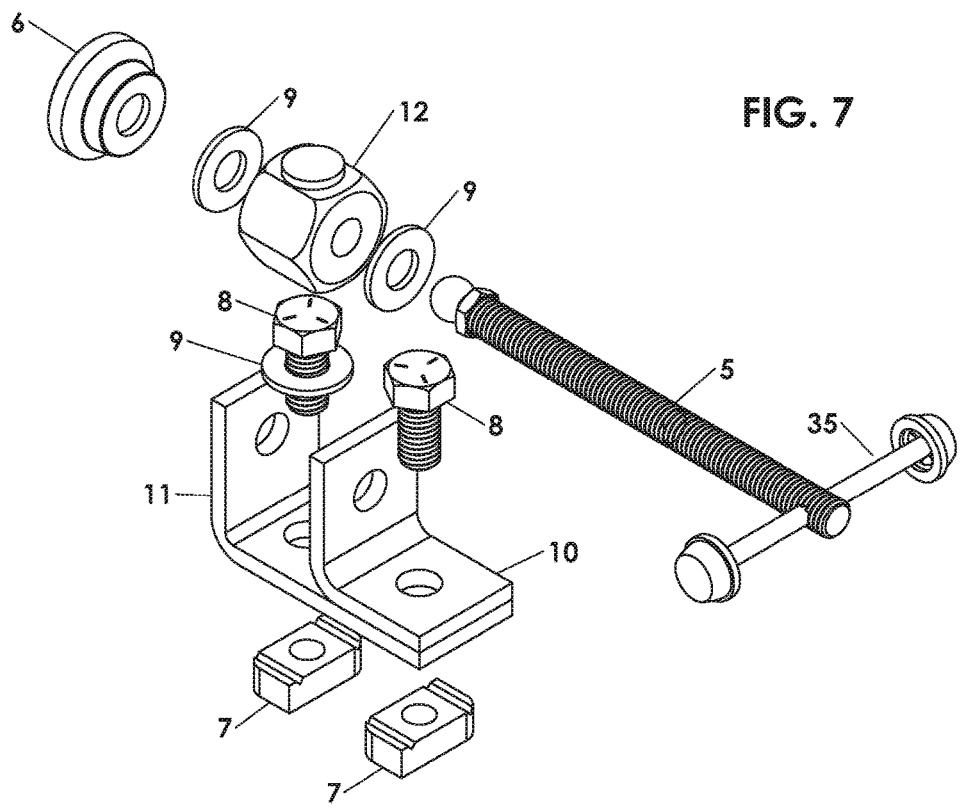
FIG. 7 is an exploded view of the clamp of FIG. 5 shown without the strut channel angle bracket stop.
Figure 8:
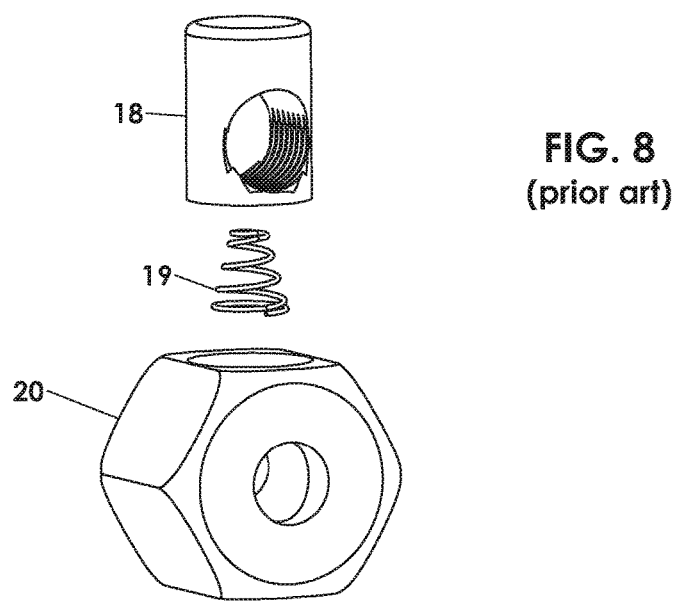
FIG. 8 is an exploded view of the quick nut disclosed in U.S. Pat. No. 5,898,974 and incorporated into embodiments of the present invention.
Figure 9:
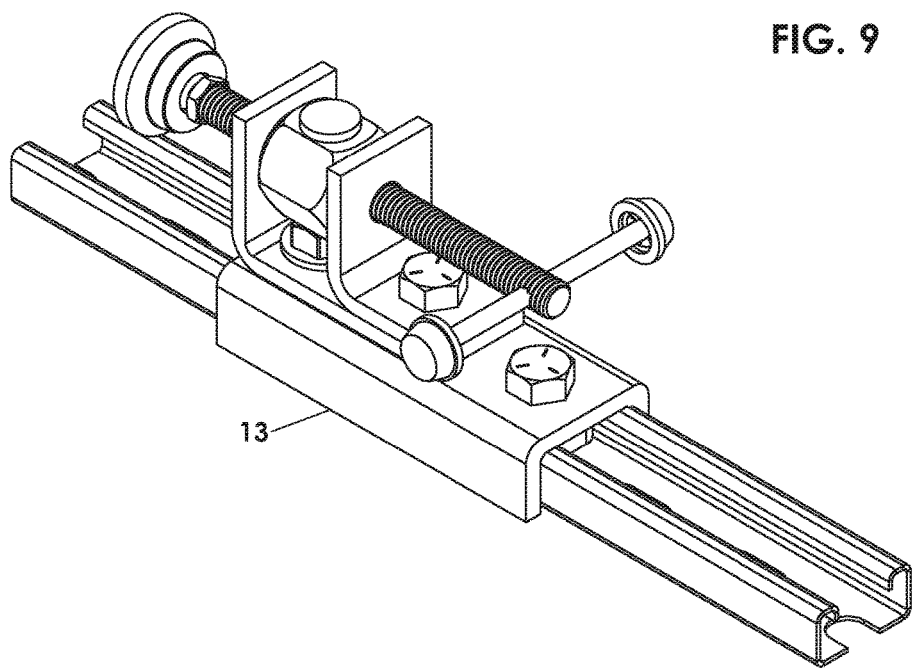
FIG. 9 is a perspective view of an embodiment of the disclosed clamp mounted to a common splice plate as supplied by most strut channel manufacturers.
Figure 10:
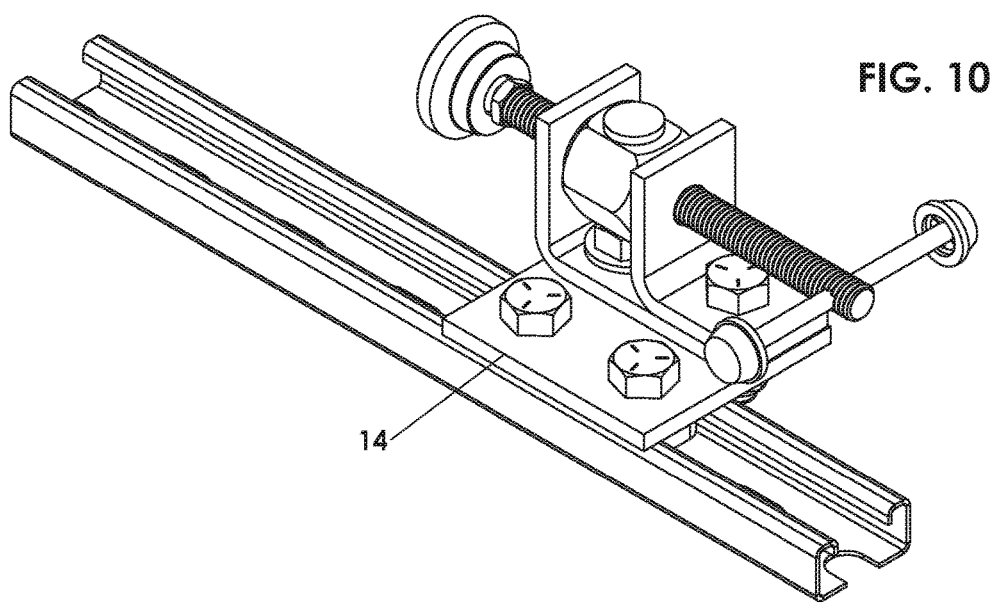
FIG. 10 is a perspective view of an embodiment of the disclosed clamp mounted to a common 4-hole plate as supplied by most strut channel manufacturers.

FIG. 5 is an embodiment that also utilizes common strut channel brackets as a frame work that creates a unique clamp block. FIG. 6 shows a partial exploded view of this embodiment, again incorporating the clamp stop 2 used in the above embodiment. FIG. 7 is a detailed exploded view of the embodiment. The strut angle brackets 10 and 11 are referred to as a 2 hole 90-degree angle bracket and a 3 hole 90-degree angle bracket respectively. The stacking of 10 on top of 11 results in a unique result where the top holes of each bracket are concentric with each other. The placement of the quick nut 12, as detailed in an exploded view shown in FIG. 8, between the two legs of the brackets and shimmed with two washers 9 creates the means of threading the threaded post 5. The cap screw 8 and washer 9 directly under the quick nut 12 provides a surface that stabilizes the quick nut 12, not allowing it to rotate. The other cap screw 8 and strut nuts 7 secure the assembly to the strut channel. Swivel cap 6 and post 35 completes the force imparting structure of the clamp. The quick nut 12 in FIG. 7 and shown in an exploded view in FIG. 8 operates in the same manner of the quick nut application in the preferred embodiment. The body 20 of FIG. 8 houses the two components 19 and 18 of the quick nut 12. This component is registered U.S. Pat. No. 5,898,974. The spring 19 exerts a force on the split nut 18. The split nut has an elongated hole. Half the hole has a threaded section while the other has a smooth section. The spring forces the engagement of the threaded portion of the split nut 18 against the threaded post 5. Pushing the spit nut down against the spring pushes the thread portion away from the threaded post 5. This allows the threaded post 5 to be pushed or pulled through the quick nut 12. FIG. 9 and FIG. 10 show optional mounting of this embodiment using strut accessories splice plate 13 and 4-hole plate 14.

Figure 11:
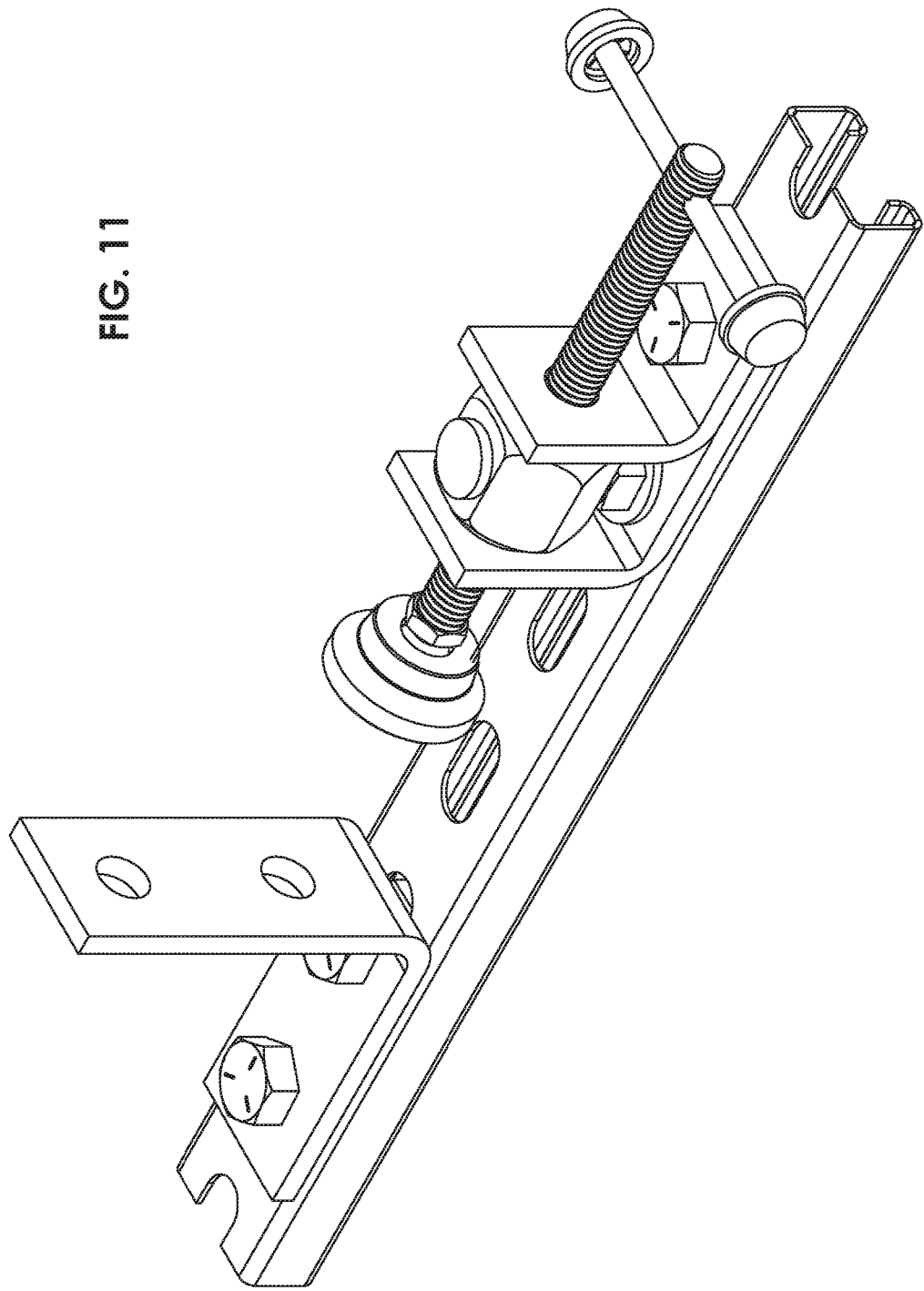
FIG. 11 is a perspective view of an embodiment of the disclosed clamp mounted to the bottom of the strut channel of FIG. 1.

FIG. 11 shows a different mounting of the embodiment from FIG. 5. In this view, the mounting of the embodiment is on the bottom of the strut channel. This surface is D defined in FIG. 1. The slots in the bottom of the strut channel match the mounting hole locations in the Strut angle brackets 10, 11 and the clamp stop 2.

Figure 29:
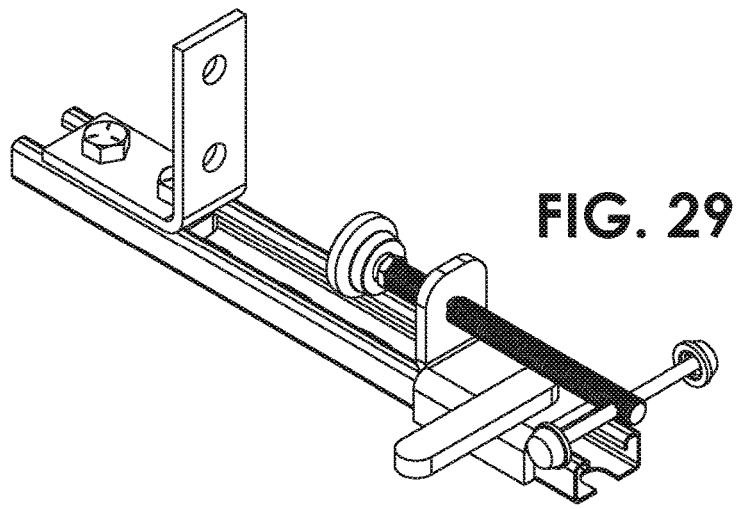
FIG. 29 is a perspective view of an embodiment that uses a formed metal design and has a threaded hole in the formed metal where threaded post is threaded, the formed metal being guided along the outside surface A shown in FIG. 1.

Supplemental embodiments shown in FIG. 29-34 incorporate a formed metal version of a clamp housing. FIG. 29 shows an isometric view of the formed metal version.

Figure 30:
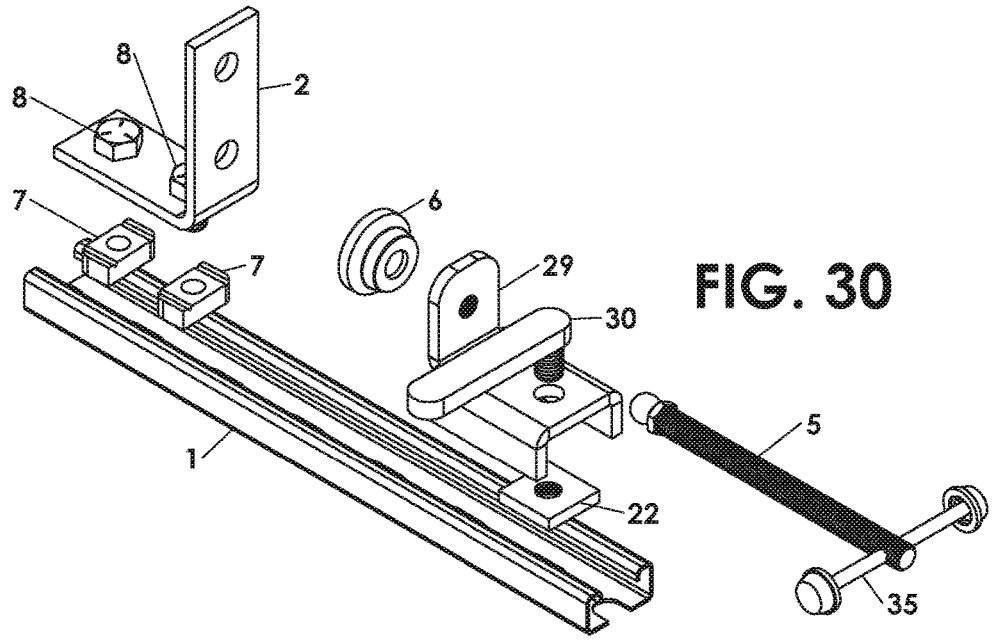
FIG. 30 is an exploded view of the embodiment of FIG. 29

FIG. 30 shows an exploded view of FIG. 29. The clamp housing plate 29 is threaded to match threaded post 5. Clamp lock handle 30 is threaded into the square strut nut 22. Tightening clamp lock handle 30 pulls up on square strut nut 22 and secures the clamp housing plate 29 to the top of the strut channel 1. The clamp stop uses the strut angle bracket 2, cap screws 8 and strut nuts 7 to secure it to the strut channel.

Figure 29A:
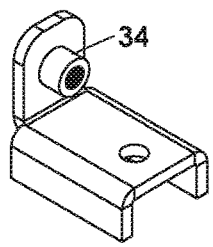
FIG. 29A is a view of the formed metal design of FIG. 29 shown with a threaded insert that is required because the material thickness is not sufficient for proper thread engagement.

FIG. 29A shows a version of the clamp housing plate 29 with a threaded insert 34. A threaded insert is used to provide more thread engagement for threaded post 5.

Figure 29B:
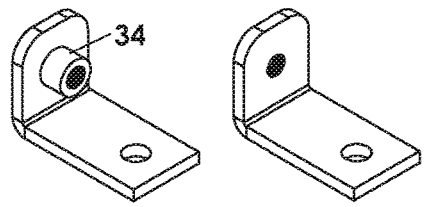
FIG. 29B compares two embodiments of a formed metal design in the form of a simple angle having two bent legs, where the formed metal design is threaded in one of the embodiments, while the other embodiment includes a threaded insert.

FIG. 29B shows a version of clamp housing plate 29 in the shape of an angle having 2 legs. A threaded insert 34 and a threaded hole option is shown as variations to this version.

Figure 31:
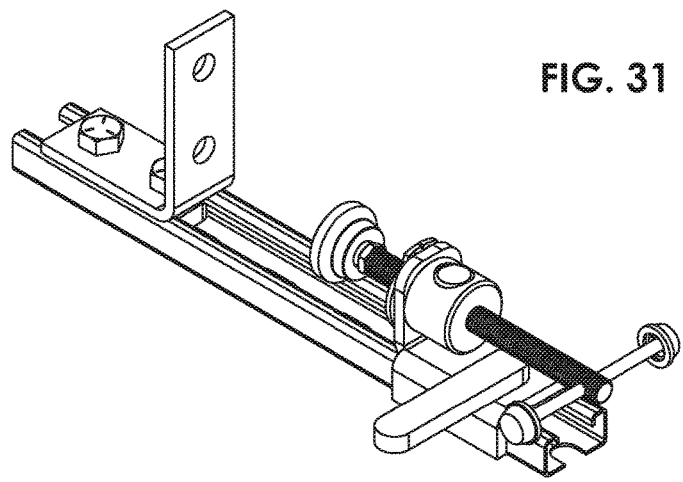
FIG. 31 is a perspective view of an embodiment that uses a formed metal design and has a quick nut pressed into the formed metal flange and held in by a snap ring 33.

FIG. 31 is an isometric view of a version of the formed metal clamp. This version incorporates a quick release mechanism that has the same function as that in FIG. 8.

Figure 32:
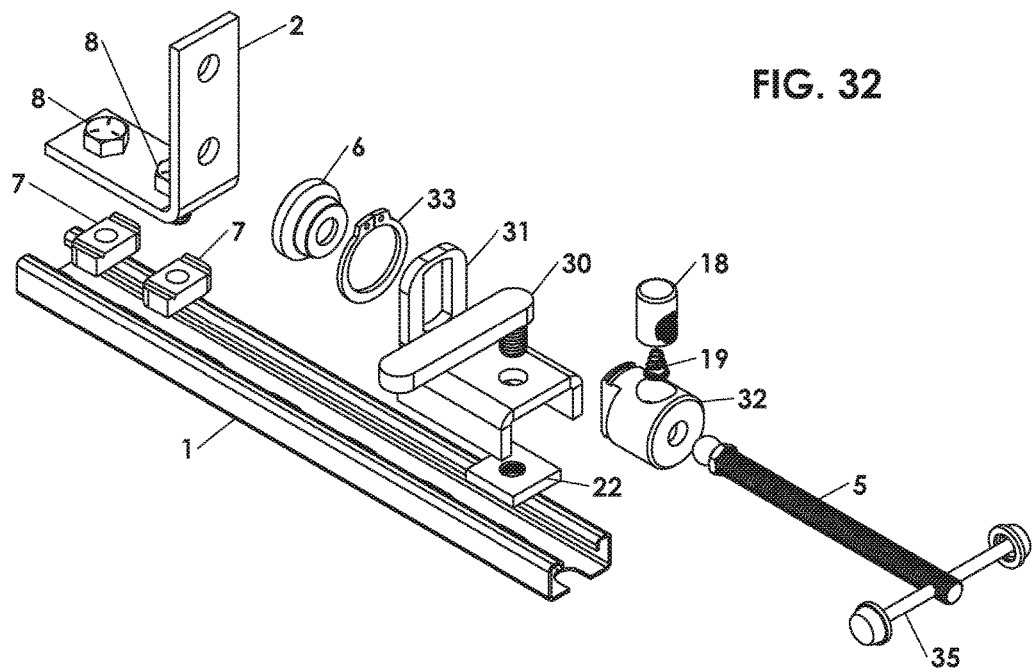
FIG. 32 is an exploded view of FIG. 31.

FIG. 32 is an exploded view of FIG. 31. The clamp housing plate 31 has a broached slot in it that fits the quick nut body 32. The quick nut body 32 has a snap ring groove on one end. A snap ring 33 is placed on the end of the quick nut body 32 after it is inserted into the slot of the clamp housing plate 31. The function of this quick nut is the same as that of FIG. 8. The housing 32 has a blind bore in it that supports the spring 19. Pushing down on the split nut 18 disengages the threaded portion of the split nut 18 from the threaded post 5. This allows the threaded post 5 to move freely. Clamp lock handle 30 is threaded into the square strut nut 22. Tightening clamp lock handle 30 pulls up on square strut nut 22 and secures the clamp housing plate 31 to the top of the strut channel 1. The clamp stop uses the strut angle bracket 2, cap screws 8 and strut nuts 7 to secure it to the strut channel.

Figure 33:
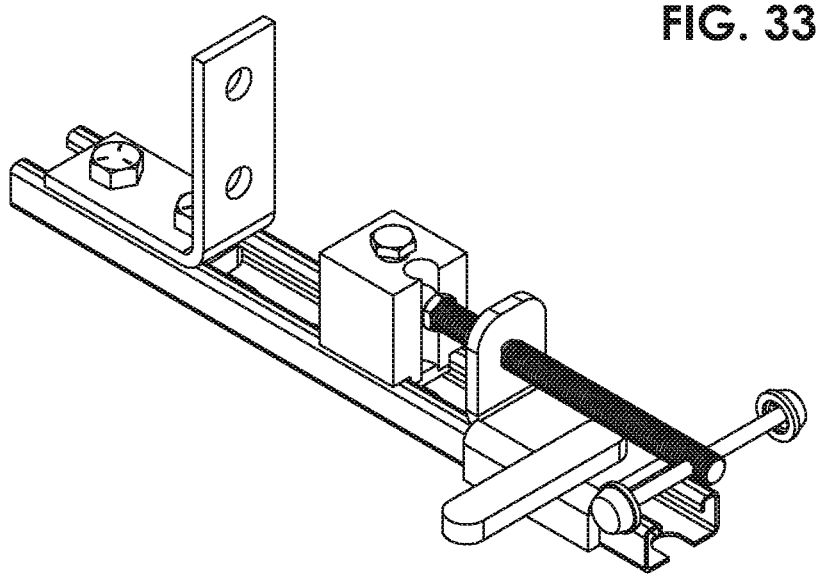
FIG. 33 is a perspective view of a formed metal strut channel clamp wherein the formed metal clamp bracket is threaded, the swivel pad is replaced by a push block, and the threaded post is threaded into a bracket and pressed into the push block.
Figure 34:
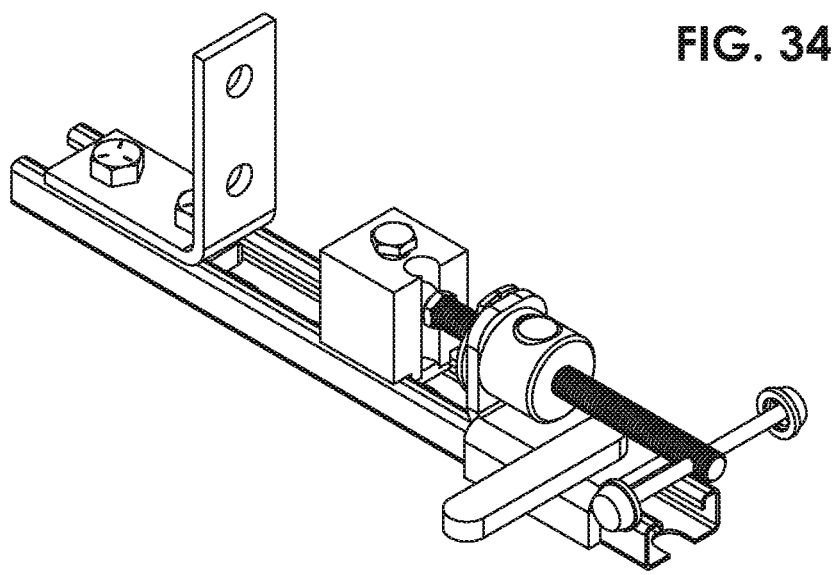
FIG. 34 is a perspective view of an embodiment that has a quick nut pressed into a formed metal flange and held in by a snap ring, whereby the quick nut allows quick release of the threaded post.

In FIG. 33 and FIG. 34, the swivel pad 6 which is pressed onto the end of threaded post 5, is replaced with an assembly that performs as a clamp stop also. This assembly of components, best viewed in FIG. 13. is described in the next paragraph.

Figure 12:
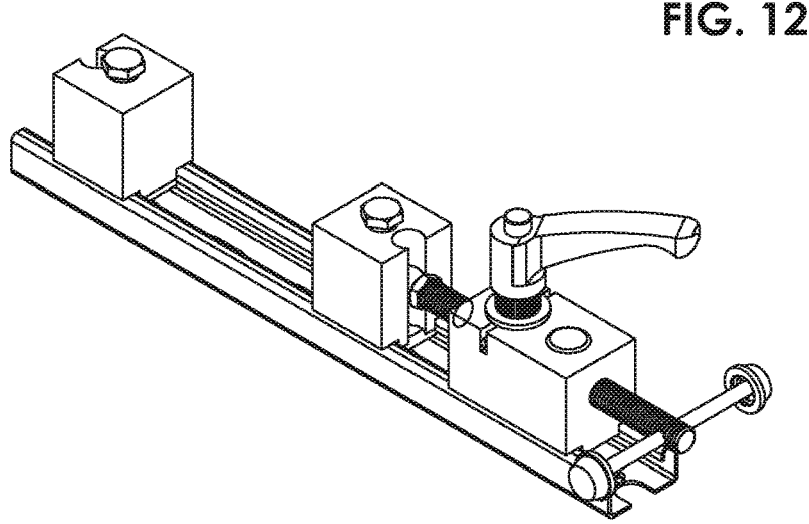
FIG. 12 is a perspective view of an embodiment that uses solid blocks of material as the primary clamp and stop structure and is guided along the inside of the strut channel.
Figure 13:
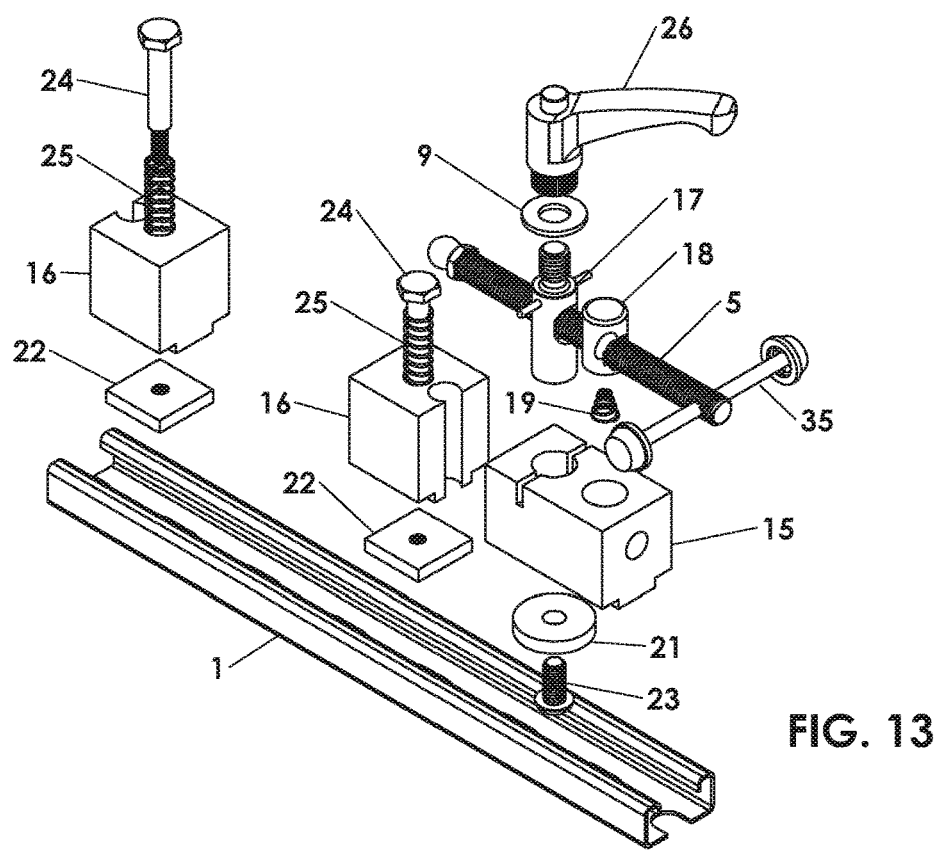
FIG. 13 is an exploded view of the Quick Strut Channel Clamp.

FIG. 12 and FIG. 13 show an embodiment of the clamp block. In these views, the clamp block 15 is mounted to the surface B shown in FIG. 1. FIG. 13 is an exploded view of FIG. 12. As mentioned above, this assembly of 22, 16, 25, 24 can also replace the swivel pad 6 of the other clamp blocks. The clamp stop housing 16 has a counter-bore hole through the center of it. The shoulder bolt 24 has a compression spring 25 that wraps around the shoulder of the bolt. The threaded end of shoulder bolt 24 is threaded into a square strut nut 22. This square strut nut fits inside the strut channel and is sized where it is not allowed to spin. In the clamp stop application, the shoulder bolt 24 is fully tightened. This secures the clamp stop to the strut channel allowing work pieces that are being clamped to hold in position. For the replacement of swivel pad 6, the same assembly is slightly loosened. This allows the clamp stop housing to freely slide along the channel.

Figure 14:
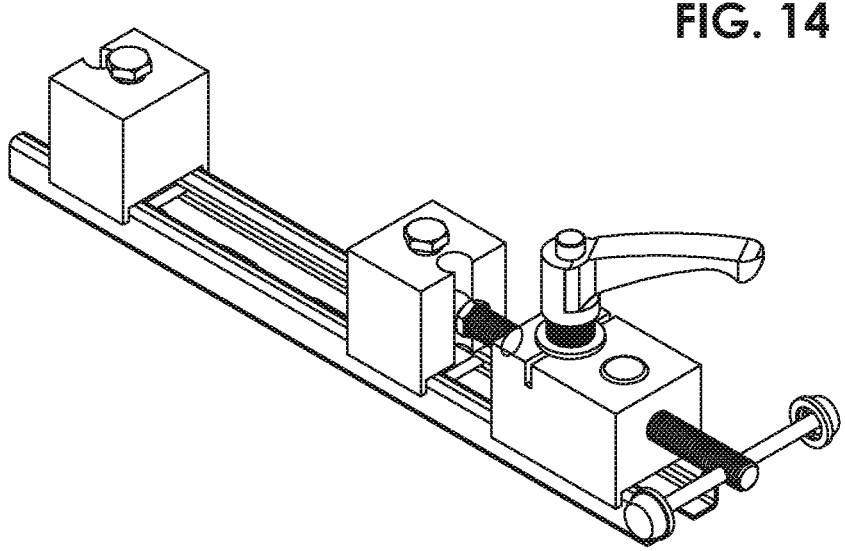
FIG. 14 is a perspective view of an embodiment that uses solid blocks of material as the primary clamp and stop structure, and is guided along the outside of the strut channel.
Figure 15:
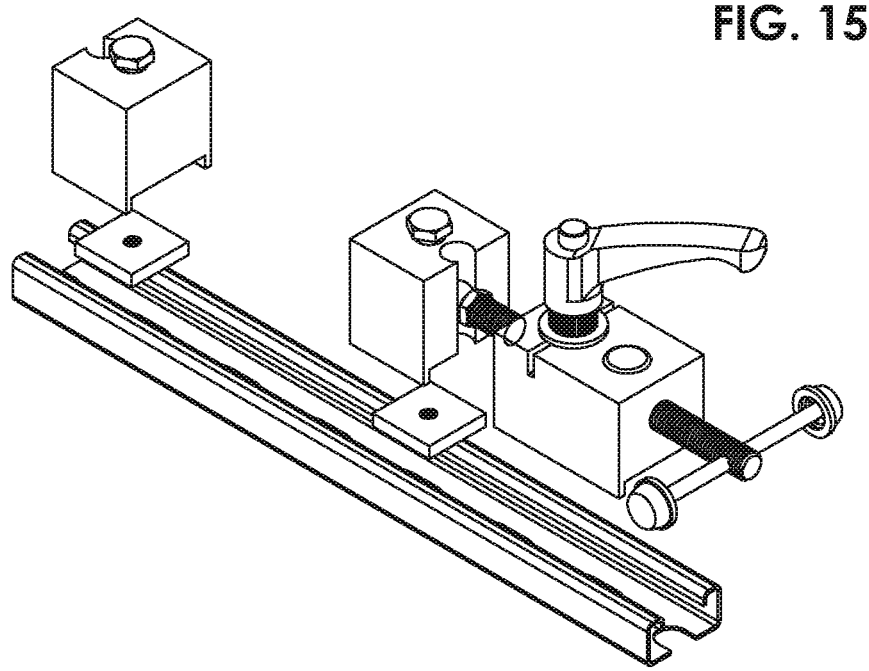
FIG. 15 is a partial exploded view of the embodiment of FIG. 14.

FIG. 14 and FIG. 15 are versions of the embodiment where the clamp block is guided along surface A shown in FIG. 1.

The final embodiment shown in FIG. 35-40 has a clamp block that produces a clamp force cantilevered from the center of gravity of the strut channel.

Figure 35:
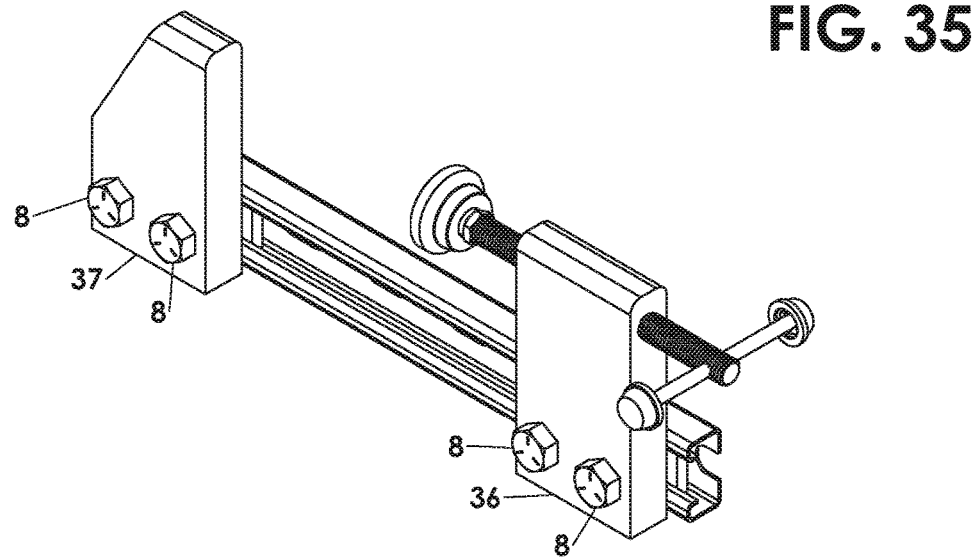
FIG. 35 is a perspective view of an embodiment that has the clamp force cantilevered or offset from the center of the strut channel, wherein the clamp block has a threaded hole in which the threaded post is threaded.
Figure 36:
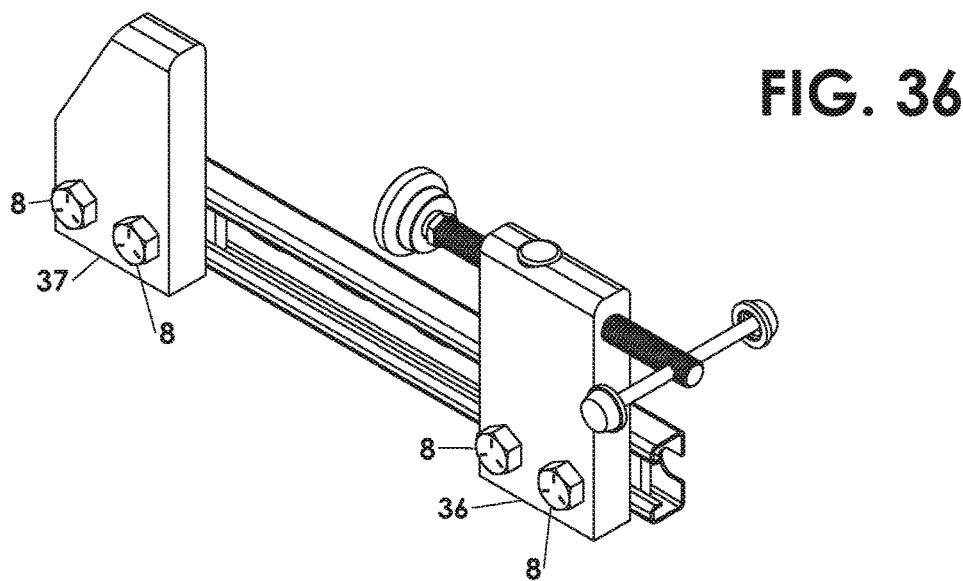
FIG. 36 is a perspective view of an embodiment that has the clamp force cantilevered or offset from the center of the strut channel, wherein the clamp block has a quick nut mechanism that allows the quick release of the threaded post.

FIG. 35 and FIG. 36 are versions of the cantilever clamp where the clamp block 36 and clamp stop 37 mounts to the surface C shown in FIG. 1. The cantilever clamp block housing 36 and the clamp stop housing 37 are bolted to the strut channel with cap screws 8 and are independently adjustable.

Figure 37:
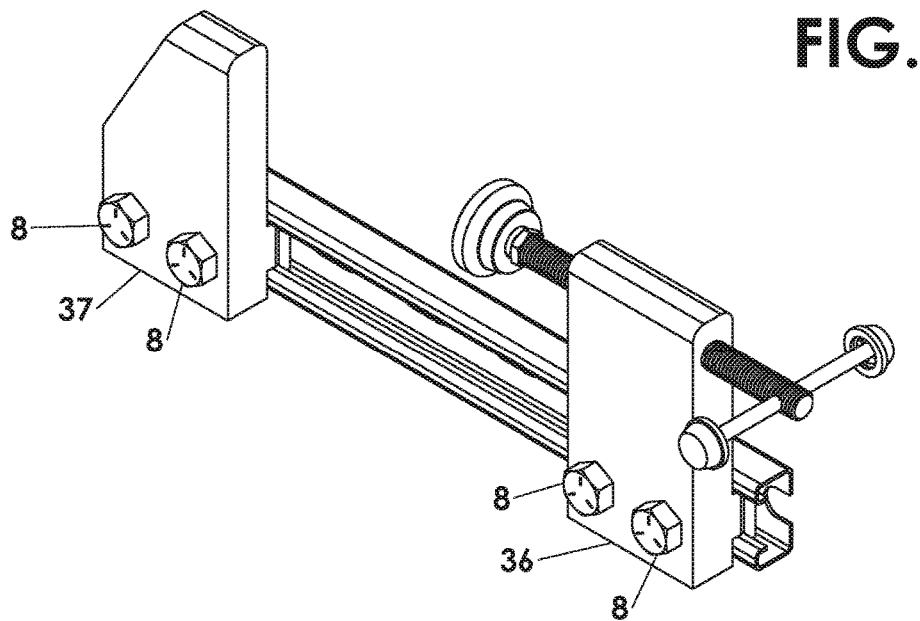
FIG. 37 is a perspective view of an embodiment that has the clamp force cantilevered or offset from the center of the strut channel, wherein the clamp and stop are guided on the inside of the gap B of FIG. 1 and the clamp block has a threaded hole in which the threaded post is threaded.
Figure 38:
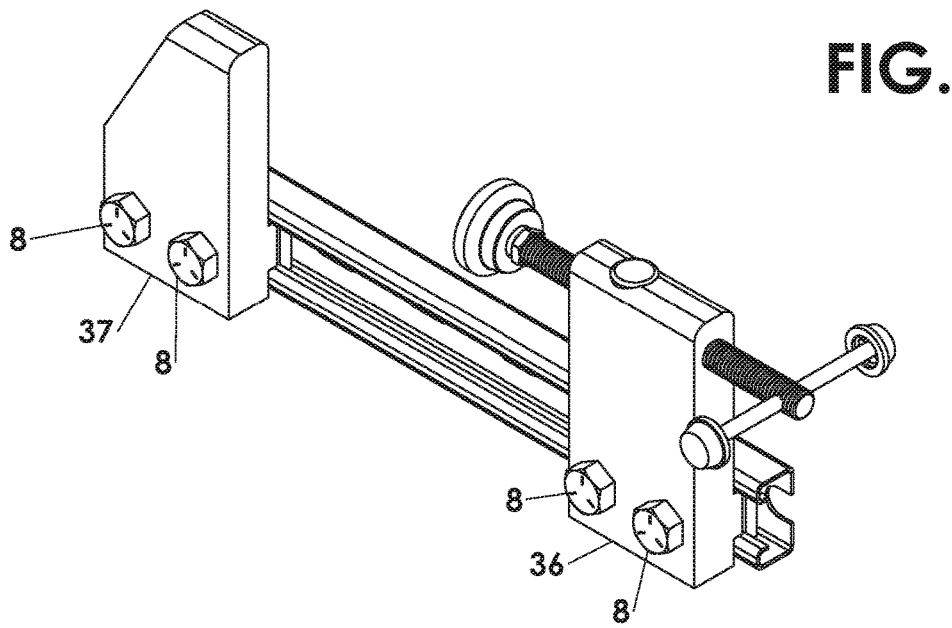
FIG. 38 is a perspective view of an embodiment that has the clamp force cantilevered or offset from the center of the strut channel, the clamp and stop being guided on the inside of the gap B as shown in FIG. 1, wherein the clamp block has a quick nut mechanism that allows the quick release of the threaded post.

FIG. 37 and FIG. 38 are versions of the cantilever clamp where the clamp block 36 and clamp stop 37 mounts to the surface B shown in FIG. 1. The cantilever clamp block housing 36 and the clamp stop housing 37 are bolted to the strut channel with cap screws 8 and are independently adjustable.

Figure 39:
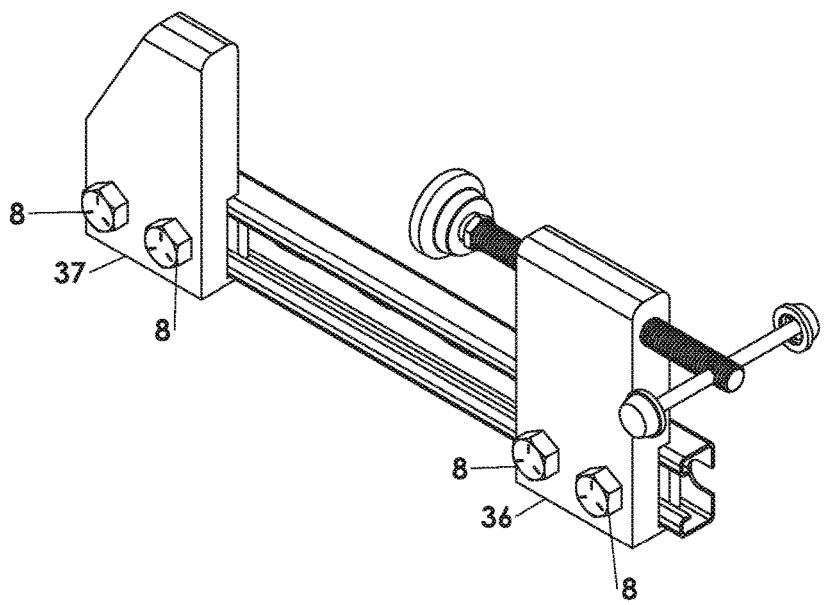
FIG. 39 is a perspective view of an embodiment that has the clamp force cantilevered or offset from the center of the strut channel, the clamp and stop being guided on the outside surface A of the strut channel shown in FIG. 1, wherein the clamp block has a threaded hole in which the threaded post is threaded.
Figure 40:
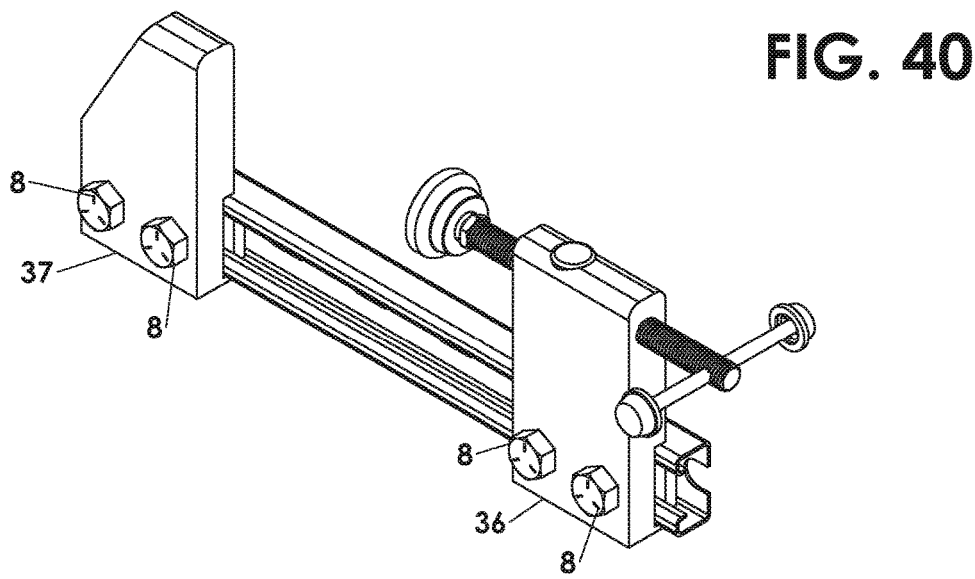
FIG. 40 is a perspective view of an embodiment that has the clamp force cantilevered or offset from the center of the strut channel, the clamp and stop being guided on the outside surface A of the strut channel shown in FIG. 1, wherein the clamp block has a quick nut mechanism that allows the quick release of the threaded post.

FIG. 39 and FIG. 40 are versions of the cantilever clamp where the clamp block 36 and clamp stop 37 mounts to the surface A shown in FIG. 1. The cantilever clamp block housing 36 and the clamp stop housing 37 are bolted to the strut channel with cap screws 8 and are independently adjustable.

Figure 41:
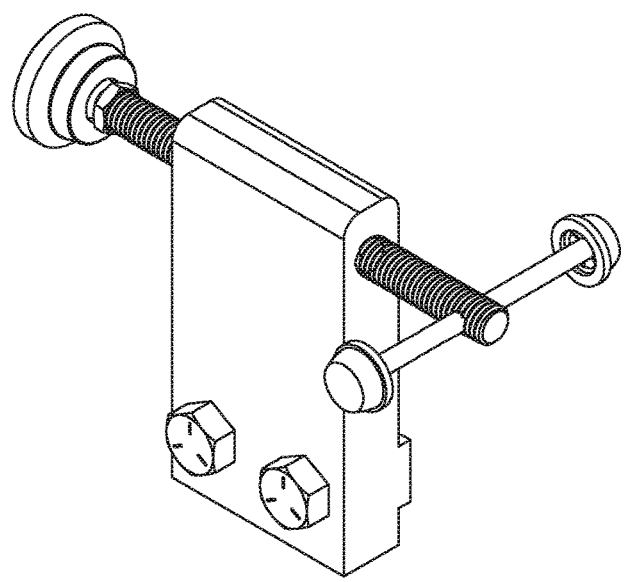
FIG. 41 is a perspective view of the clamp block of FIG. 37, clamp block having a threaded hole in which the threaded post is threaded.

FIG. 41 shows an isometric view of the threaded version of the clamp block 36.

Figure 42:
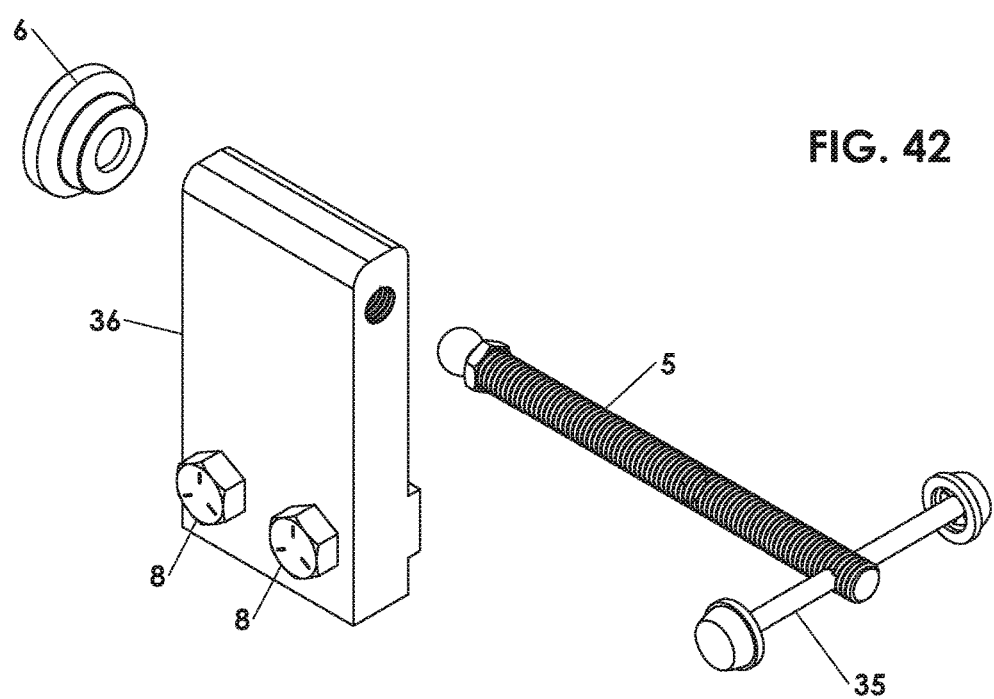
FIG. 42 is an exploded view of FIG. 41.

The FIG. 42 shows an exploded view of a threaded version of the cantilever clamp block 36. The cap screws 8 secures the clamp block 36 to the strut channel. Threaded rod 5 screws into the threaded clamp block 36. The swivel pad 6 snaps on the end of threaded rod 5. Turning the T bar 35 produces the clamp force against a work piece.

Figure 43:
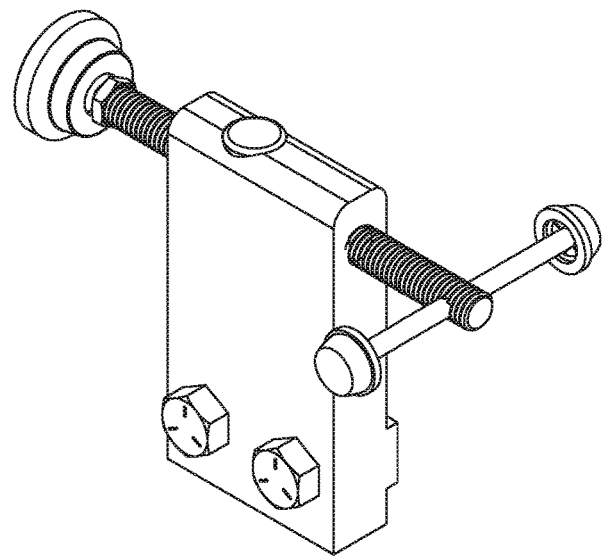
FIG. 43 is a perspective view of the clamp block of FIG. 38, where the clamp block has a threaded hole in which the threaded post is threaded.

FIG. 43 shows an isometric view of the quick nut version of the clamp block 36.

Figure 44:
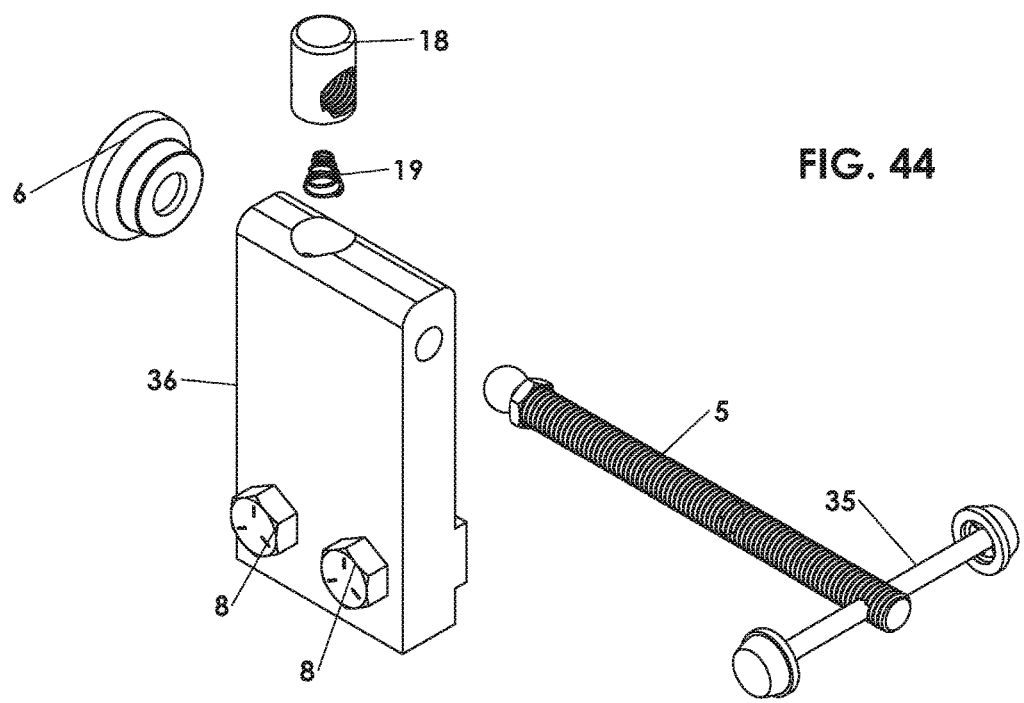
FIG. 44 is an exploded view of FIG. 43.
Figure 45:
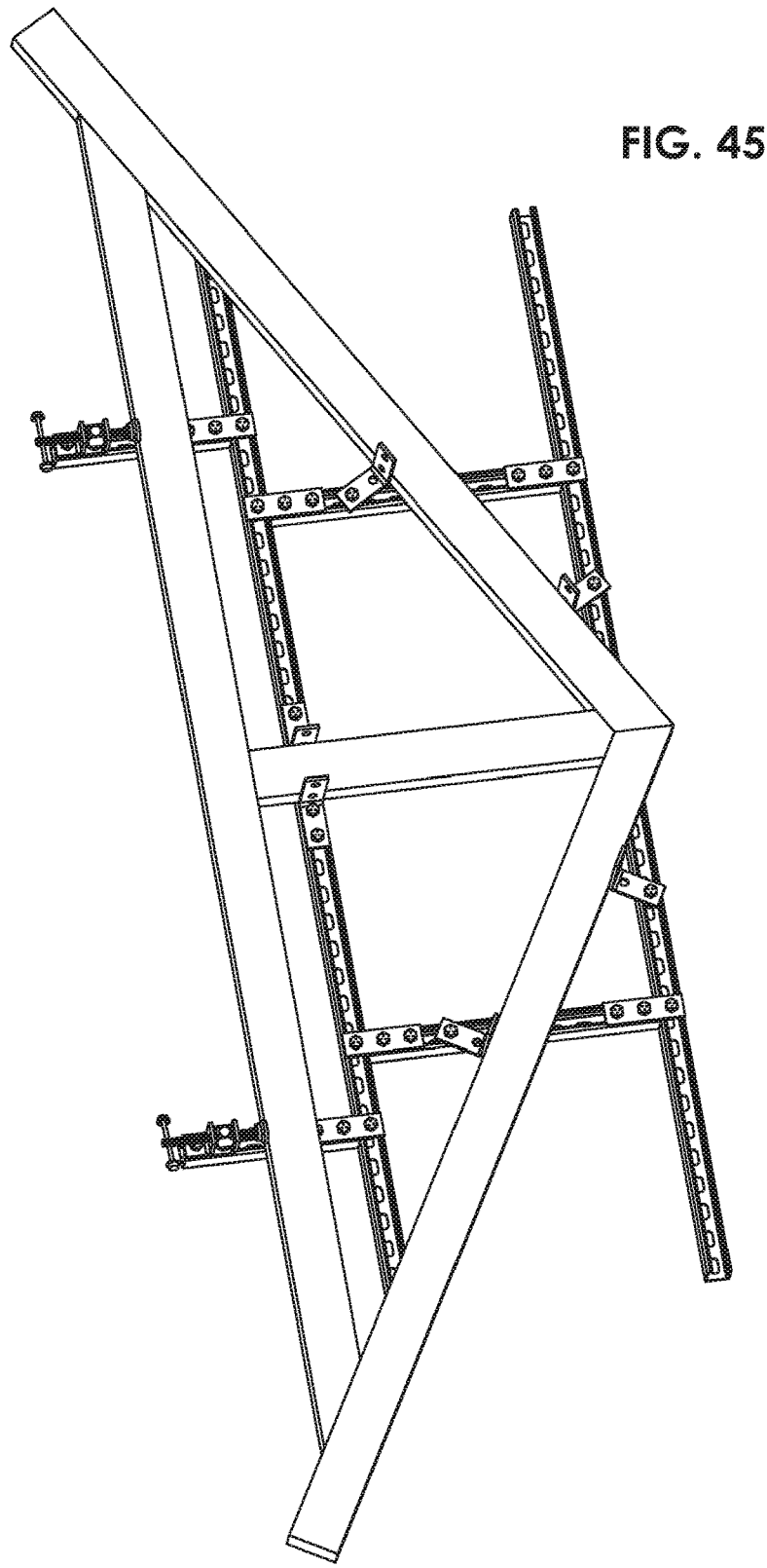
FIG. 45 is a perspective view of an assembly jig for a roof truss constructed using Strut Channel clamps from FIG. 7 combined with 4-hole angle brackets 2.

FIG. 44 shows an exploded view of a threaded version of the cantilever clamp block 36. The cap screws 8 secure the clamp block 36 to the strut channel. Threaded rod 5 screws into the threaded clamp block 36. The swivel pad 6 snaps on the end of threaded rod 5. Turning the T bar 35 produces the clamp force against a work piece. Pushing down on the split nut 18 pushes against spring 19 which disengages the threaded portion of the split nut 18 from the threaded post 5. This allows the threaded post 5 to move freely.

OTHER GENERAL ASPECTS OF THE INVENTION

Figure 54:
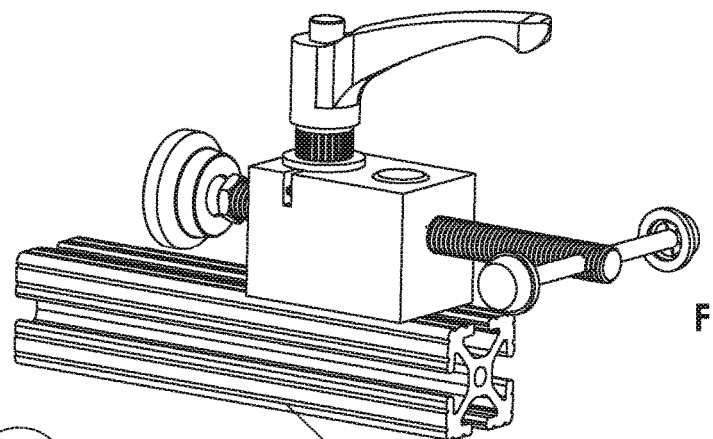
FIGS. 54-55 show a version of the strut channel/"T" slot extrusion quick clamp that uses a "T" slot style extrusion/ track or bar.
Figure 55:
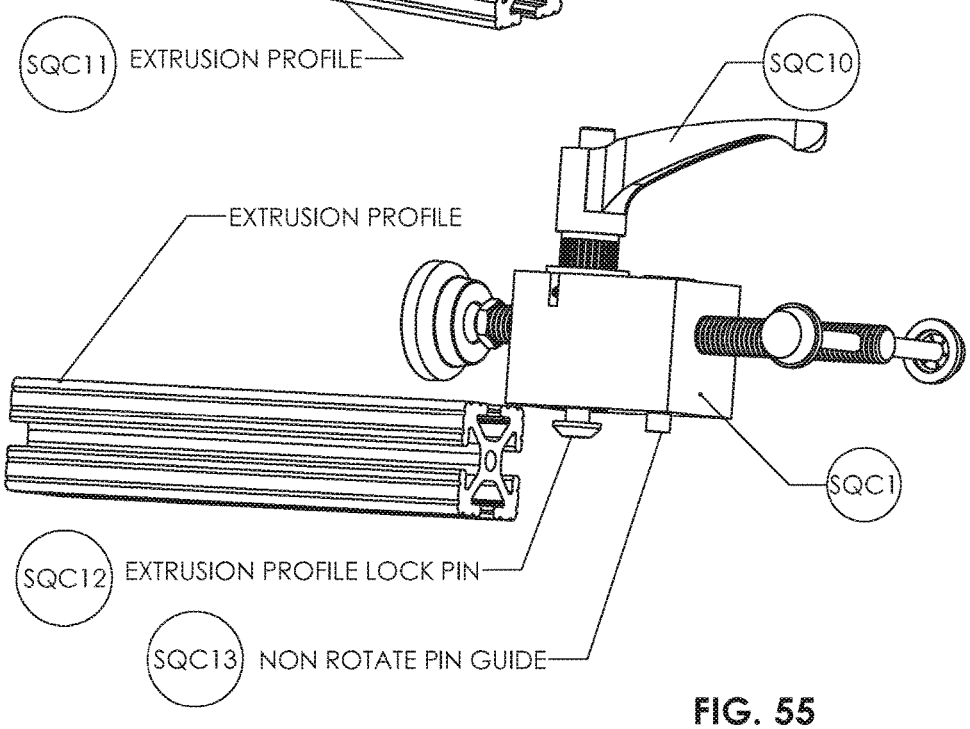

General Aspect 2: Strut Channel/"T" Slot Extrusion Quick Clamp
Description:

FIG. 46 is the complete quick clamp mounted on a strut channel. The advantage of this clamp is its' use of commercially available strut channel. Some of the manufactures of the strut channel and accessories are, but not limited to: Super Strut, Unistrut, B-Line and PHD. The advantage of using the strut channel components is that no welding is required and a person can simply bolt the pieces together using common tools. Both the channel and accessories are available in home improvements stores worldwide. This quick clamp is able to be positioned anywhere along the strut channel and locked in place. The FIGS. 54-55 show a version of the same quick clamp, but mounting on a "T" slot style extrusion/track/or bar.

FIG. 47 shows the quick clamp without the strut channel. This view along with FIG. 48 shows the individual parts that make the quick clamp.

FIG. 48 shows an exploded view of the quick clamp. The clamp block (SQC1) is the main body of the clamp housing. It has two holes in it. One hole is passes through the clamp block. This hole is for the clamping/securing the quick clamp to the strut/extrusion. The clamp pin (SQC2) is secured to the Strut square washer (SQC6) using a button head cap screw (SQC7). The clamp pin (SQC2) has a slot in it that allows the pass through of the clamp handle (SQC5). The clamp pin (SQC2) has a pin through it. This pin keeps the slot in line with the clamp handle (SQC5). A strut clamp handle (SQC10) is threaded on the top end of the clamp pin. This assembly (parts (SQC7), (SQC6), (SQC2), (SQC9), (SQC10)) is what secures the clamp block (SQC1) in position on the strut channel/"T" extrusion. When the strut clamp handle is tightened (SQC10), it draws up the strut square washer (SQC6) up against the inside of the strut channel. This strut square washer is for the strut channel version of the quick clamp.

The second hole of the clamp block does not pass through the block. It is a blind bore hole, meaning that it is only partially through the clamp block. The bottom of this hole is used as a spring seat for the spring (SQC4). This spring exerts a force on the split nut (SQC3). The split nut has an elongated hole. Half the hole has a threaded section while the other has a smooth section. This split nut was adapted from a quick nut registered at the USPTO file U.S. Pat. No. 5,898,974. The spring forces the engagement of the threaded portion of the split nut (SQC3) against the clamp handle (SQC5) thread. Pushing the spit nut down against the spring pushes the thread portion away from the clamp handle (SQC5). This allows the clamp handle to be pushed/pulled through the clamp block (SQC1) along the length of the channel/extrusion.

Figure 49:
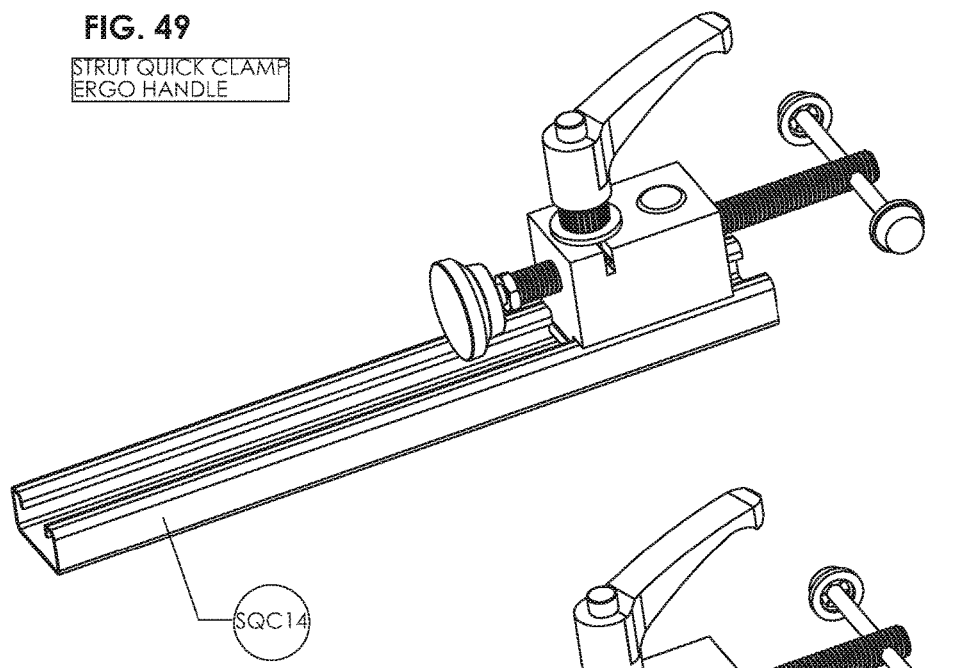
FIG. 49 and FIG. 50 show different clamp handle designs for the strut channel/"T" slot extrusion quick clamp.
Figure 50:
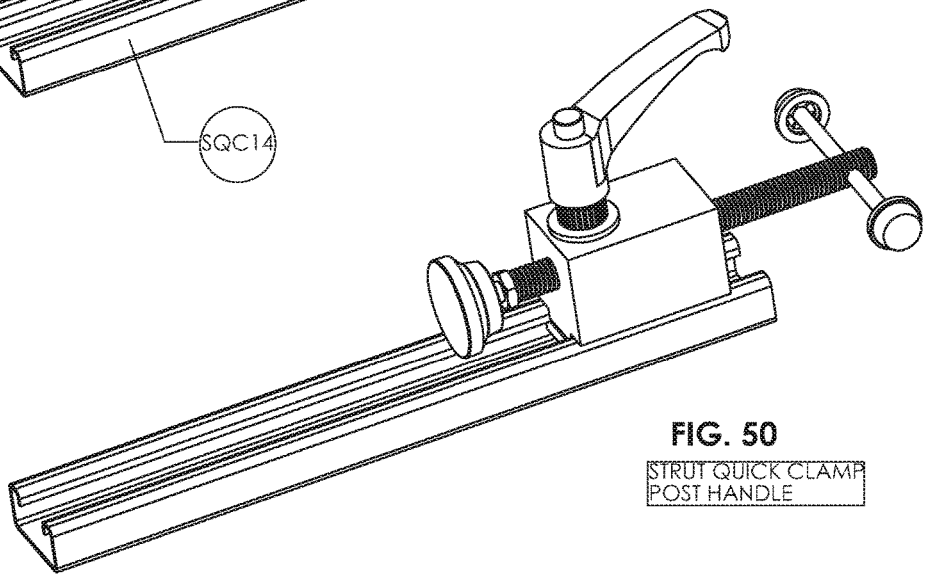

FIG. 49 and FIG. 50 shows different clamp handle designs. In FIG. 50, this handle is typical of many "C" clamp handles. In FIG. 49, the same handle is used in both securing the clamp block (SQC1) to the strut channel/"T" slot extrusion and clamping/advancing the clamp handle to the item to be clamped.

Figure 51:
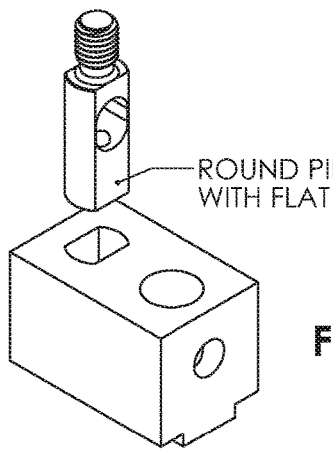
FIGS. 51-53 show variations in the clamp pin (SQC2) of FIG. 48.
Figure 52:
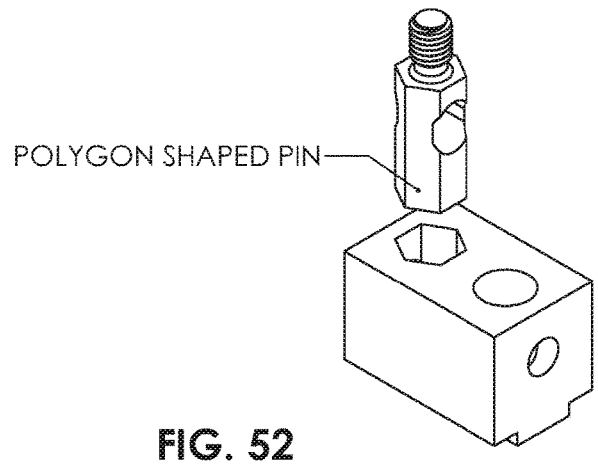
Figure 53:
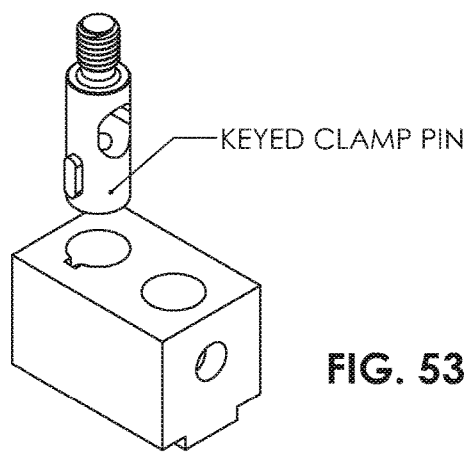

FIGS. 51-53 show variations in the clamp pin (SQC2) of FIG. 48. The variations show different ways to keep the pin from rotating and interfering with the movement/positioning of the clamp handle (SQC5). The variations are a round pin with flat(s), polygon shaped pin, and keyed pins. Each pin variation has its' respective clamp block (SQC1) matched bore. Other variations can include (not shown) but not limited to: spline style pins, elliptical pins, 3 sided and square (polygon) shaped pins, etc.

In the FIGS. 54-55, the quick clamp version using "T" slot style extrusion/track or bar is shown. Unlike the strut channel version, the clamp pin (SQC12) has a matched end that fits into a "T" style slot of extrusion profile (SQC11). Turning the handle (SQC10) pulls up on the stepped end of the clamp pin (SQC12) and secures the clamp block (SQC1) along any point of the extrusion/"T" slot track/bar. A non-rotate pin (SQC13) fits inside the "T" slot of the extrusion profile (SQC11) and keeps the clamp block from spinning and maintains its' direction/alignment along the extrusion.

Figure 56:
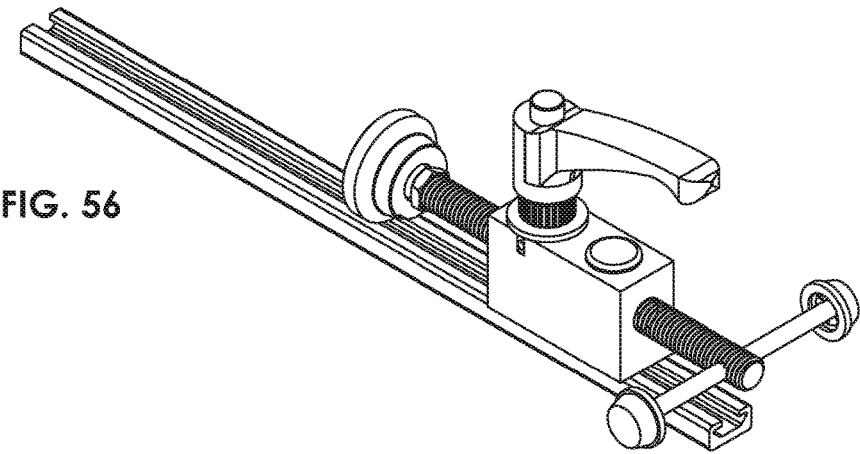
FIG. 56 shows an isometric view of a smaller profile of an extrusion with a "T" slot clamp.

FIG. 56 shows an isometric view of a smaller profile of an extrusion with a "T" slot clamp.

Figure 57:
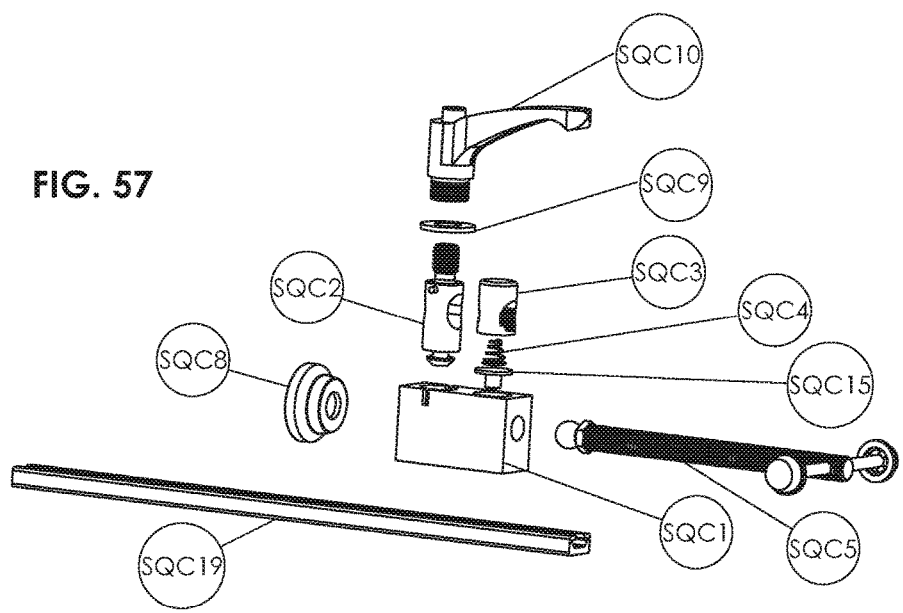
FIG. 57 is an exploded view of FIG. 56.

FIG. 57 is an exploded view of FIG. 56. The clamp housing (SQC1) is the main body of the clamp housing. It has two holes in it. One hole passes through the clamp housing. This hole is for the securing the clamp block to the strut channel. The clamp pin (SQC2) has an end that has a profile that matches the inside section of the "T" extrusion (SQC19). The clamp pin (SQC2) has a slot in it that allows the pass through of the threaded post (SQC5). The clamp pin (SQC2) has a pin through it. This pin keeps the slot in line with the threaded post (SQC5). FIGS. 66-69 display other methods to prohibit the rotation of clamp pin (SQC2). A lock handle (SQC10) is threaded on the top end of the clamp pin (SQC2). The assembly of (SQC2), (SQC9), (SQC10) is what secures the clamp housing (SQC1) in position on the "T" profile extrusion (SQC19). When the lock handle (SQC10) is tightened, it draws up the end of clamp pin (SQC2) that has the profile of the inside shape of the extrusion, up against the inside of the extrusion (SQC19).

The second hole of the clamp housing (SQC1) has a counterbored hole through the block. Placed in the bottom of the counterbored hole is a movable button (SQC15). One side of the button is used as a seat for the spring (SQC4). This spring pushes down on the button (SQC15) and split nut (SQC3). The end of the button (SQC15) that is not against the spring (SQC4) engages the inside of the "T" extrusion (SQC19). This engagement allows the clamp block (SQC1) to be positioned in line with the length of the "T" extrusion. The spring (SQC4) exerts a force on the split nut (SQC3). The split nut has an elongated hole. Half the hole has a threaded section while the other has a smooth section. This split nut was adapted from a quick nut registered at the USPTO file U.S. Pat. No. 5,898,974. The spring forces the engagement of the threaded portion of the split nut (SQC3) against the threaded post (SQC5). Pushing the spit nut down against the spring pushes the thread portion away from the threaded post (SQC5). This allows the threaded post (SQC5) to be pushed or pulled through the clamp housing (SQC1) along the length of the clamp housing (SQC1). The end of threaded post (SQC5) has a swivel cap (SQC8) pressed onto it. This provides the contact surface on the work piece. This ball joint design provides a non-marring feature that will not damage the work piece to be clamped.

Figure 58:
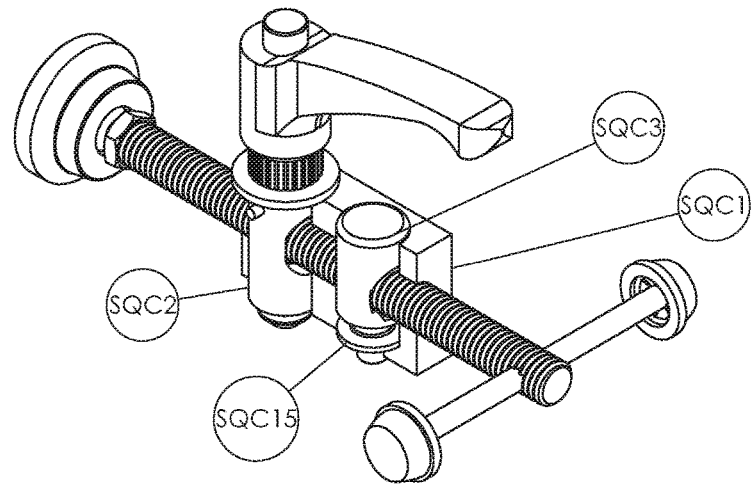
FIG. 58 is an isometric view of the clamp of FIG. 57.

FIG. 58 is an isometric view of the clamp with the clamp block (SQC1) cut away to show the position of split nut (SQC3), button (SQC15) and clamp pin (SQC2).

Figure 59:
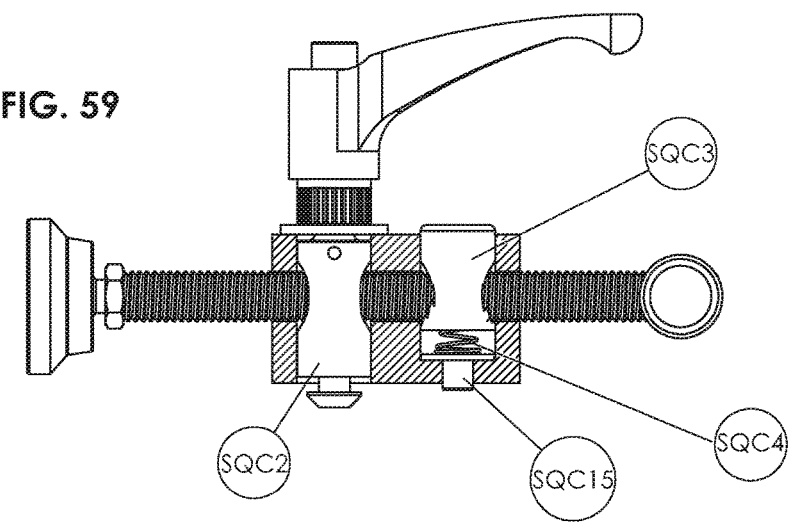
FIG. 59 is a section view of FIG. 58.

FIG. 59 is a section view of FIG. 58.

Figure 60:
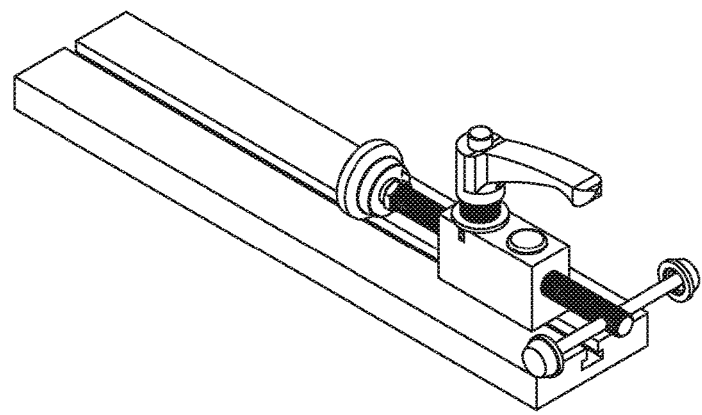
FIG. 60 is an isometric view of a different style of "T" extrusion.

FIG. 60 is an isometric view of a different style of "T" extrusion.

Figure 61:
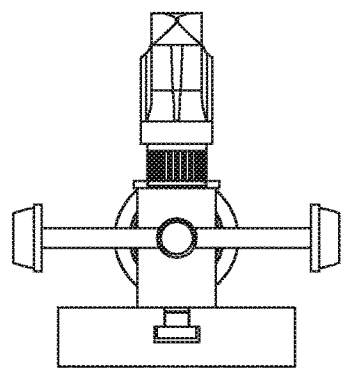
FIG. 61 is an end view of FIG. 60.

FIG. 61 is an end view of FIG. 60.

Figure 62:
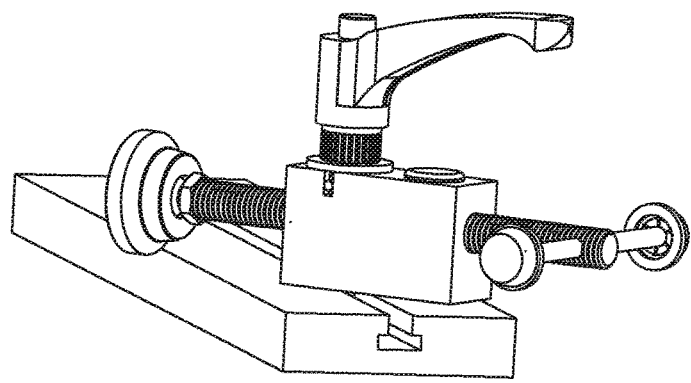
FIG. 62 is an isometric view of FIG. 60.

FIG. 62 is an isometric view of FIG. 60. In this view, the clamp is rotated on the face of the extrusion. The button (SQC15) in this position will be pushed up against spring (SQC4) into the clamp block (SQC1). In this position, the button (SQC15) is not needed to keep the clamp block (SQC1) in line with the extrusion (SQC17).

Figure 63:
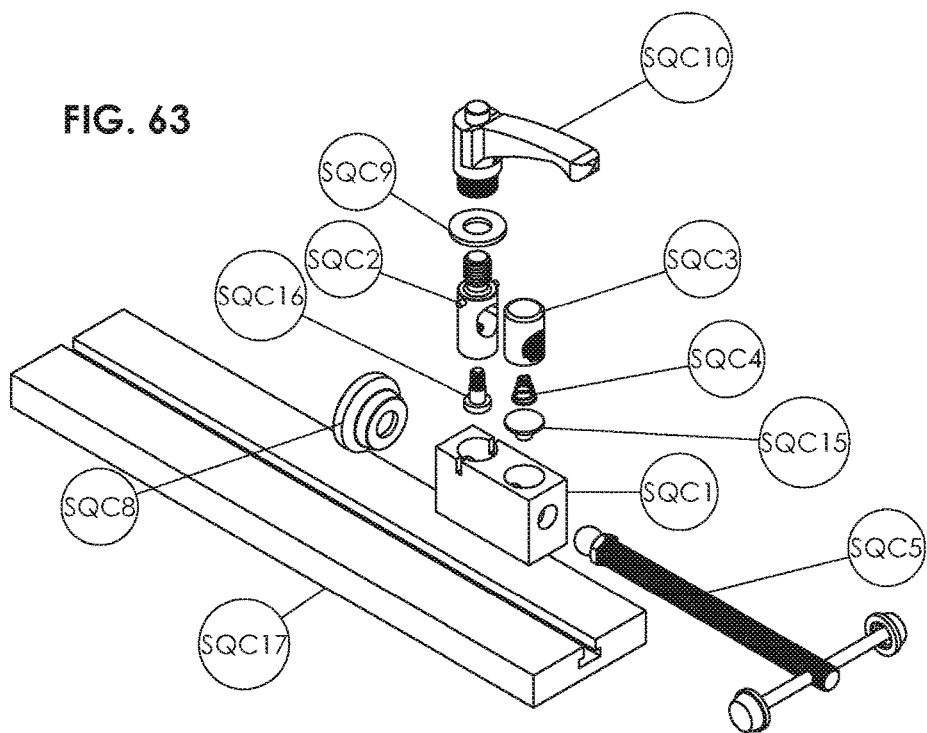
FIG. 63 is an exploded view of FIG. 60.

FIG. 63 is an exploded view of FIG. 60. The parts are similar to those shown in FIG. 57 as well as the mode of operation. The clamp pin (SQC2) in this view does not have an end that is in the form of the "T" extrusion profile (SQC17). It has a separate bolt on end (SQC16). This bolt on end (SQC16) allows the same clamp to be used on different "T" extrusion profiles.

Figure 64:
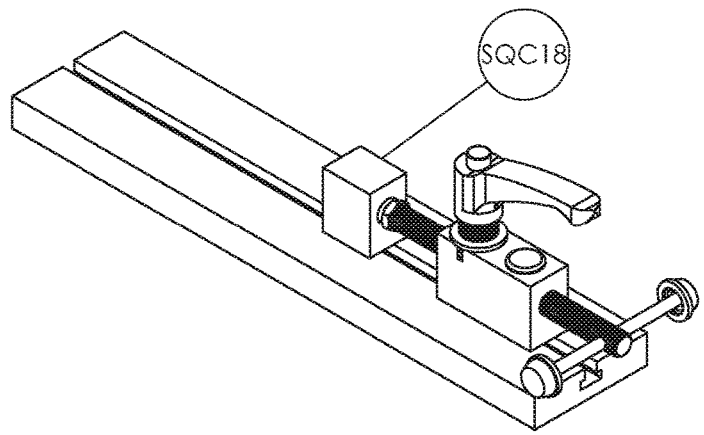
FIG. 64 is an isometric view of FIG. 60.

FIG. 64 is an isometric view of FIG. 60 with an end push bar (SQC18). This push bar (SQC18) is used to replace the swivel end (SQC8) when the need of a rigid surface is required. This push bar (SQC18) does not swivel like that of swivel pad (SQC8).

Figure 65:
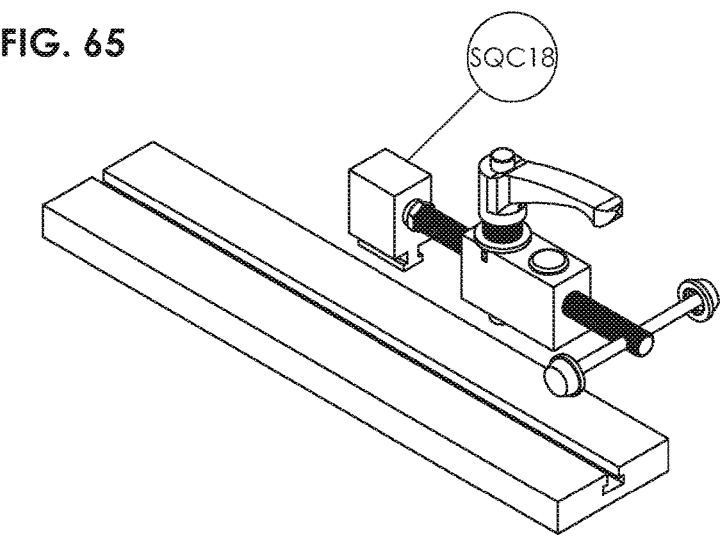
FIG. 65 is a partial exploded view of FIG. 64.
Figure 66:
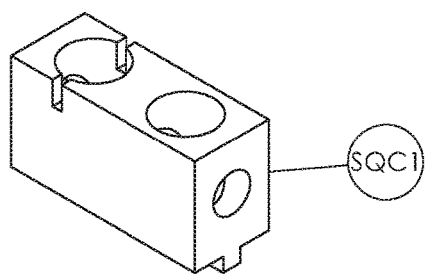
FIG. 66 is a perspective view of a clamp block having a slotted bore hole.
Figure 67:
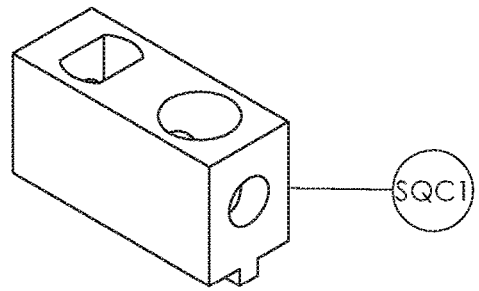
FIG. 67 is a perspective view of a clamp block having a flat-sided oval bore hole.
Figure 68:
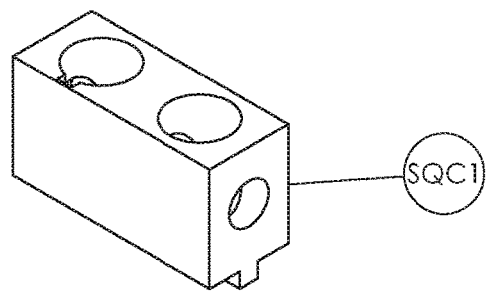
FIG. 68 is a perspective view of a clamp block having a round bore hole with a key slot.
Figure 69:
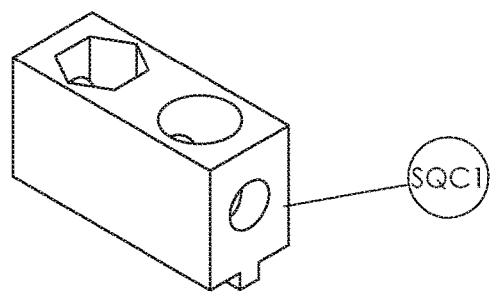
FIG. 69 is a perspective view of a clamp block having a hexagonal bore hole.

FIG. 65 is a partial exploded view of FIG. 64. In this view, the end push bar (SQC18) is shown raised out of the extrusion. The bottom edge of the push bar (SQC18) has the contour of the extrusion profile.

Figure 70:
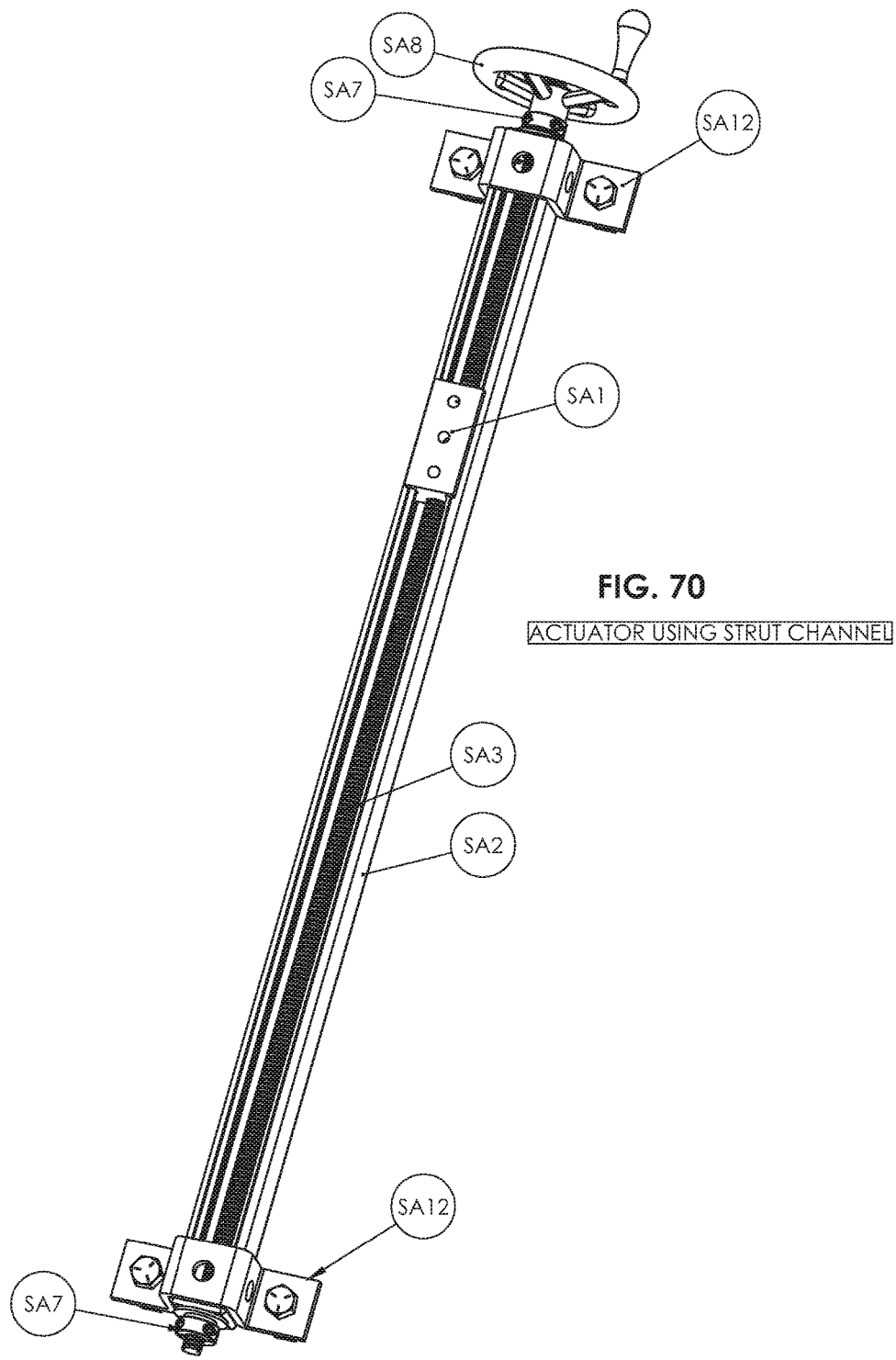
FIG. 70 is a complete linear actuator using a strut channel.

General Aspect 3: Linear Actuator Using a Strut Channel Description:

FIG. 70 is the complete linear actuator using a strut channel. The advantage of this linear actuator is its' use of commercially available strut channel. Some of the manufactures of the strut channel and accessories are, but not limited to: Super Strut, Unistrut, B-Line and PHD. The advantage of using the strut channel components is that no welding is required and a person can simply bolt the pieces together using common tools. Both the channel and accessories are available in home improvements stores worldwide.

FIG. 70 shows the full view of the linear actuator. The main components of the linear actuator are: The strut channel (SA2), carriage block (SA1), the threaded screw/lead screw (SA3), end cap bearing assembly (parts SA4, SA5, SA6, SA7), hand wheel (SA8) and the linear actuator mounting brackets (SA12).

Figure 75:
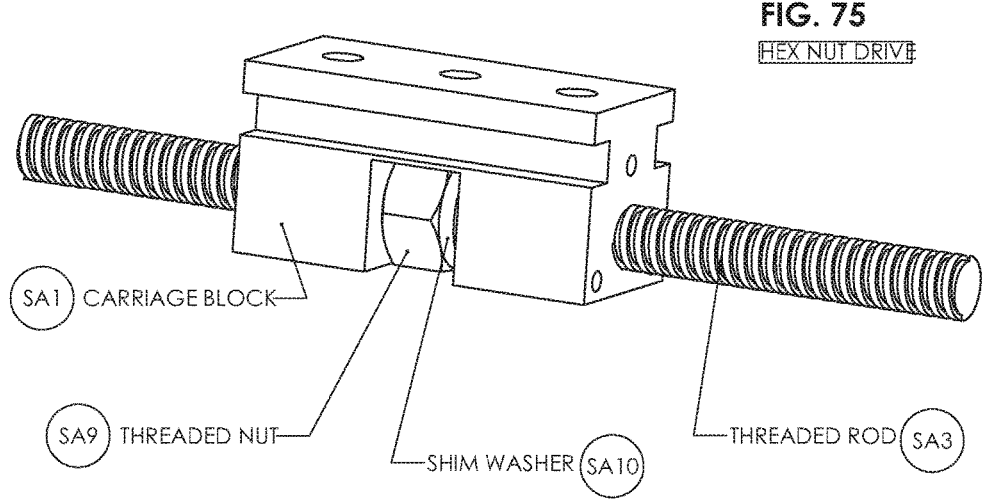
FIGS. 75 through 77 illustrate a means of driving the carriage block.
Figure 76:
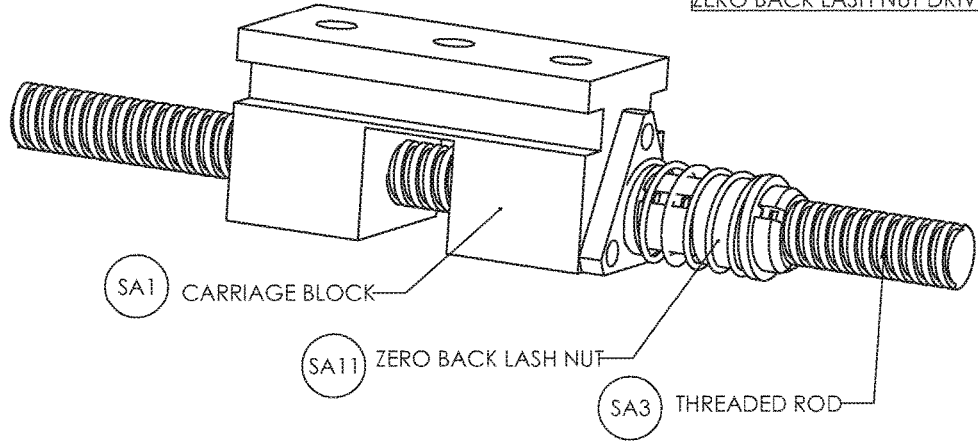
Figure 77:
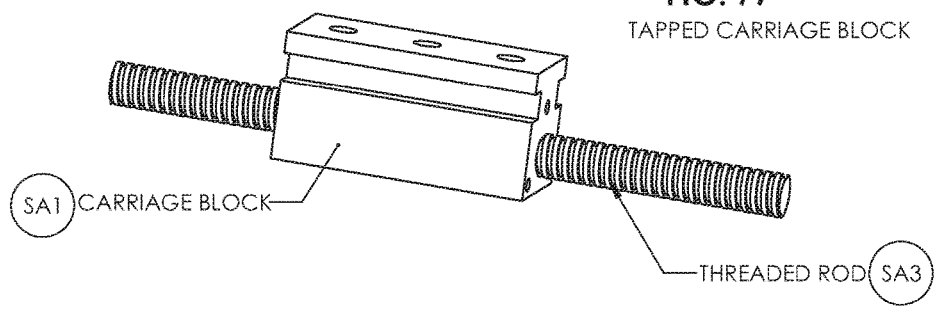

The means of driving the carriage block is shown in FIG. 75, FIG. 76 and FIG. 77. In FIG. 75, the carriage block is powered/moved by a captive nut (SA9) that is the female threaded match of the shaft (SA3). A thrust washer (SA10) is placed between the nut and the carriage block to allow an adjustment in fit/backlash. Other style nuts can also be substituted in place of the nut and washer. For a zero backlash application, FIG. 76 shows an alternative to the captive threaded nut. In this view, a special zero backlash lead screw nut (SA11) is mounted on the end of the carriage block (SA1). The respective threaded screw/lead screw shaft is used (SA3). In FIG. 77, a tapped hole in the carriage block (SA1) is matched with its respective screw.

Figure 71:
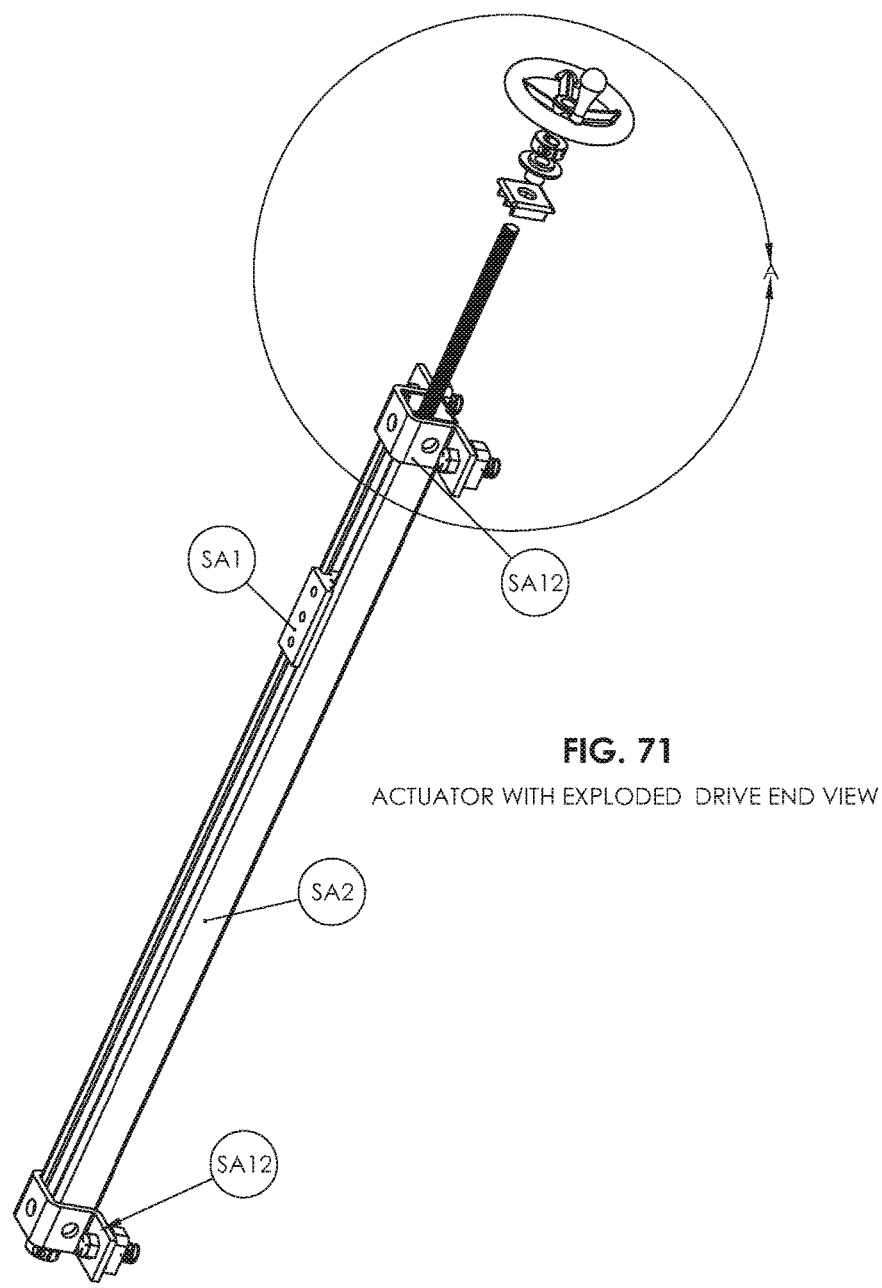
FIG. 71 shows an overall view of the linear actuator of FIG. 70 with the drive end exploded out showing the parts of the bearing assembly.

FIGS. 72A and 72B show the relationship of the carriage block (SA1) and the strut channel (SA2). The carriage block (SA1) has grooves that clear the upper bent edges of the strut channel. The upper section of the carriage block (SA1)

supports/guides itself along the open end of the strut channel. The lower half of the carriage block has a through hole through its length where the threaded screw/lead screw (SA3) passes through. The ends of the lead screw extend past the ends of the strut channel (SA2). On each end of the strut channel are bearing assemblies that support the threaded screw/lead screw. FIG. 71 shows the overall view of the linear actuator with the drive end exploded out showing the parts of the bearing assembly. In this case, the end bearing assembly has a hand wheel (SA8) that requires an operator to manually rotate/crank the hand wheel (SA8) to induce motion to the carriage block.

FIG. 73 shows a detail view of the bearing assembly typical of the ends of the strut channel. In this view, the end bearing assembly has a hand wheel (SA8). Each end of the linear actuator has a standard strut channel bracket (SA12) which is available from most of the strut channel system manufacturers.

The end bearing assemblies consist of: A strut end cap (SA4) that has a hole through the center of it. This allows a flange bushing (SA5) to be pressed into it. A thrust washer (SA6) is placed under the flange of the said flange bushing (SA5) to take thrust loads when advancing the threaded screw. To keep the entire assembly in place, a shaft collar (SA7) is placed on each end of the threaded screw/lead screw (SA3). As seen in FIG. 73, a hand wheel (SA8) is added on one end to allow manual operation. Other means of inducing power to the drive end can also be used (motor, pulley, gears, etc.)

Figure 74:
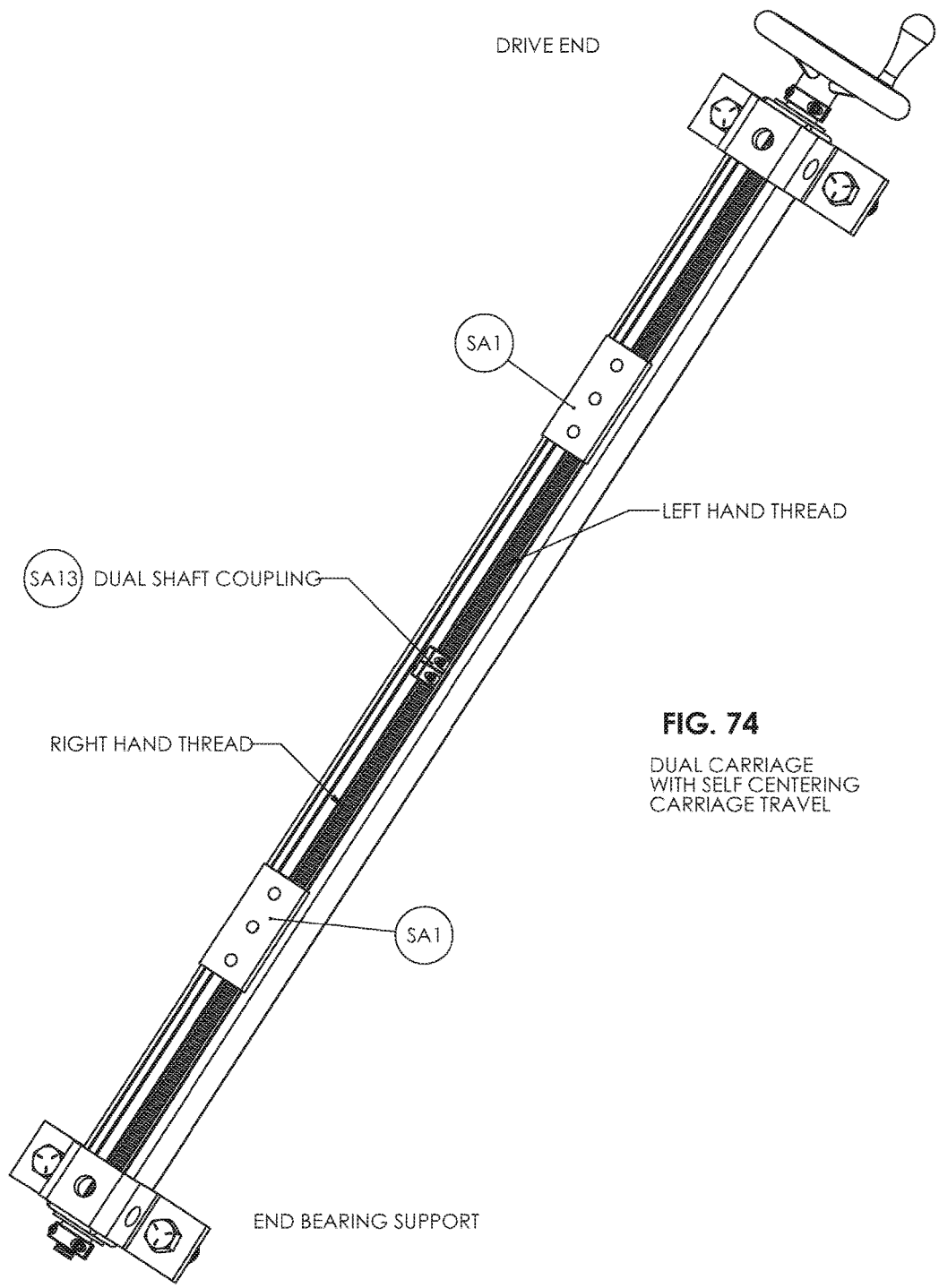
FIG. 74 shows an additional option for the same type of linear actuator as FIG. 70.

FIG. 74 shows an additional option for the same type of linear actuator. This mechanism is known as a self-centering mechanism. In this view, two opposite threaded screws/lead screws are coupled together in the center of the strut channel by and extended shaft collar (SA13). The two individual carriage blocks have the respective threaded nut of which the threaded screw/lead screw passes through. The operator turns/cranks the hand wheel (SA8) which turns the threaded screw which then induces a travel/motion to each of the carriage blocks. One direction of the hand wheel causes the carriage blocks to move toward each other while the opposite rotation will result in the carriage blocks moving away from each other.

Figure 78:
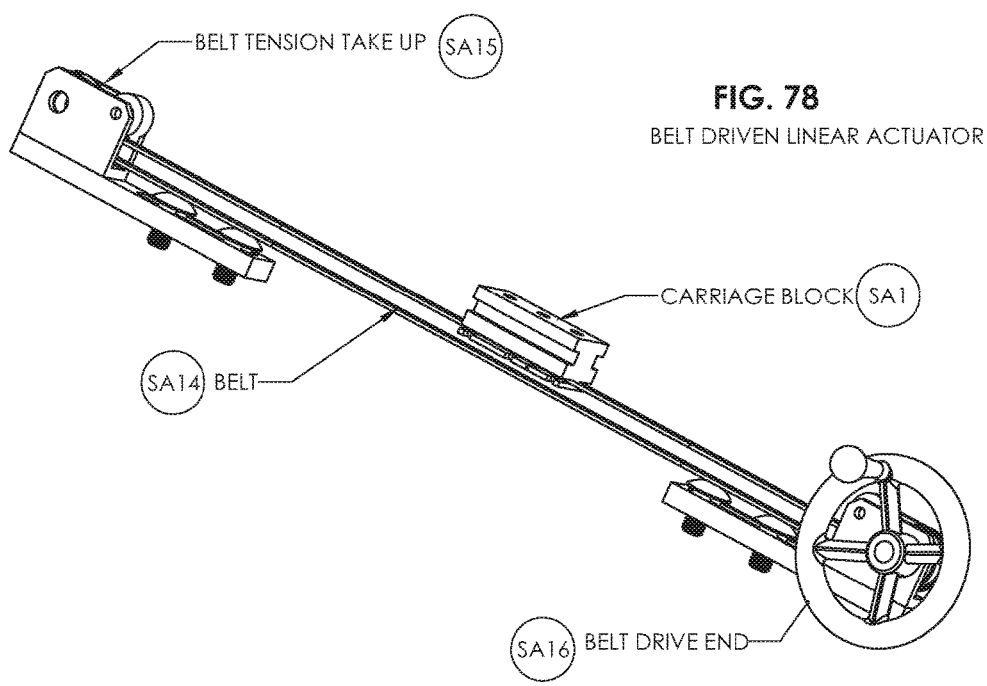
FIG. 78 is a belt driven version of the linear actuator.

FIG. 78 is a belt driven version of the linear actuator. In FIG. 78 the strut channel is not displayed in order to show the drive belt details. The drive belt (SA14) is attached to the carriage (SA1). On one end is the belt take up (SA15) which is used to take up the belt slack. The belt drive end (SA16) is similar in function as belt the take up (SA15) with the exception that it has an extended drive input shaft where a handwheel or other rotational input device is attached to.

Operation:

Screw Linear Actuator:

As mentioned above in the detailed description, the linear actuator is activated by an input to the end of the extended threaded screw/lead screw (SA3) on the drive end. The input can be a hand wheel (SA8), pulley, gear, motor, or other power supplied device. Turning the threaded screw/lead screw imparts a rotation inside the captive nut (SA9) of the carriage block (SA1). Because the captive nut is kept from rotating via the carriage block structure, the carriage block then moves along the length of the strut channel (SA2).

Belt Linear Actuator:

As mentioned above in the detailed description, the belt linear actuator is activated by an input to the belt drive end (SA16). The input can be a hand wheel (SA8), pulley, gear, motor, or other power supplied device. Turning the hand-wheel results in the belt (SA14) pulling the carriage block (SA1) along the length of the strut channel.

General Aspect 4: Strut Channel Panel Saw

DESCRIPTION

Figure 79:
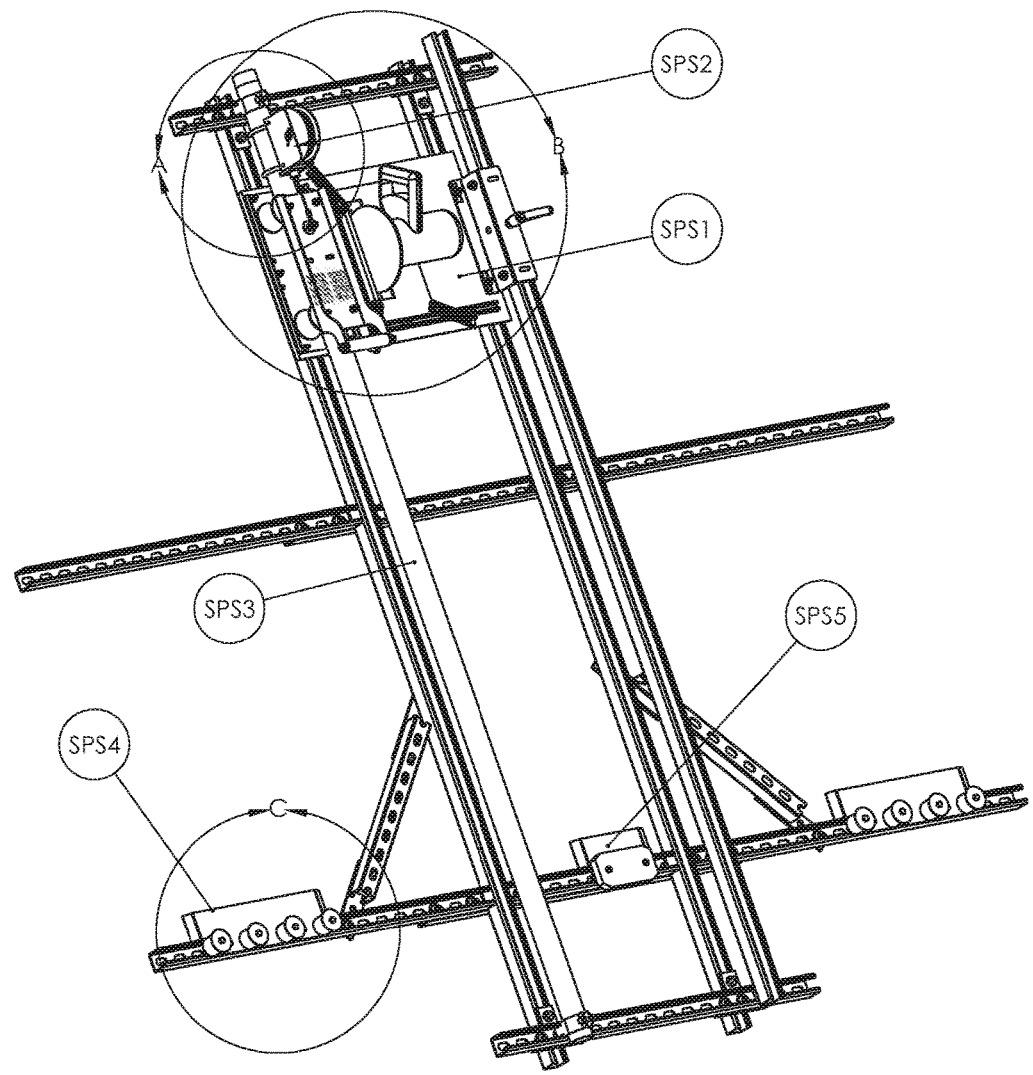
FIG. 79 is a complete strut channel panel saw.

FIG. 79 is the complete panel saw assembly. The construction of this panel saw is primarily made from commercially available strut channel. Some of the manufactures of the strut channel and accessories are, but not limited to: Super Strut, Unistrut, B-Line and PHD. The advantage of using the strut channel components is that no welding is required and a person can simply bolt the pieces together using common tools. Both the channel and accessories are available in home improvements stores worldwide.

The panel saw has five major components. These components mount to strut channel and other strut accessories. FIG. 79 shows the main components:

The saw carriage (SPS1) is made of three parts. These are the guide roller mount channels (SPS6), the side angle support (SPS8) and the saw mount base (SPS9). These are shown in detail in FIG. 82.

The counter balance (SPS2) is mounted to a plate that is secured to the guide shaft (SPS3) using "U" style bolts. The counter balance is a wrap spring/continuous force mechanism. A dead weight counter weight could also be used. The counter balance helps the operator raise the saw carriage back up to the top when a saw cut is complete.

Figure 82:
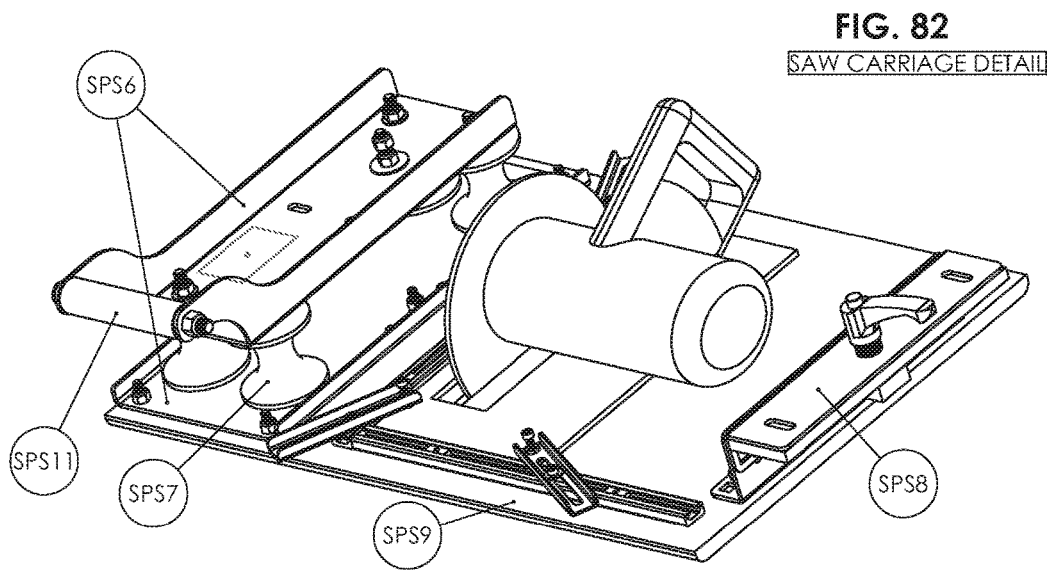

The guide shaft (SPS3) is a common pipe that is matched with profile of the four "U" profile guide rollers (SPS7) shown in FIG. 82 that guide the carriage along the guide shaft. The ends of the guide shaft/pipe is secured to the top and bottom of the strut channel frame using standard pipe hangers.

Figure 83:
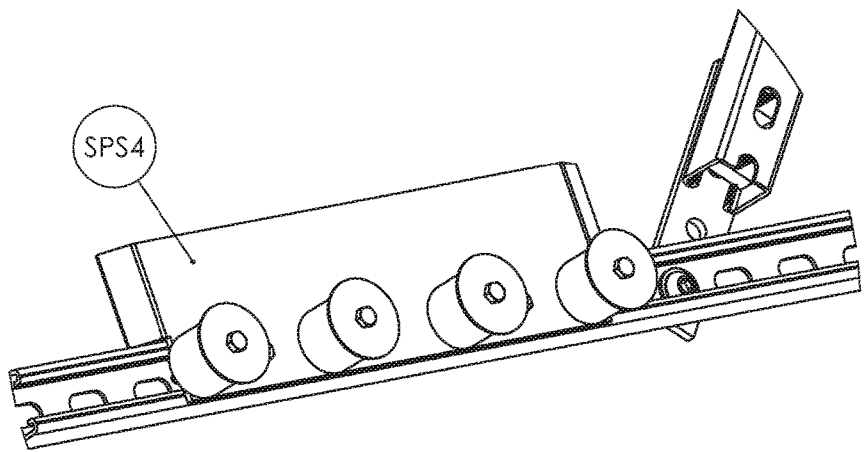
FIGS. 83 and 84 show a detail of the panel support roller assembly of FIG. 79.
Figure 84:
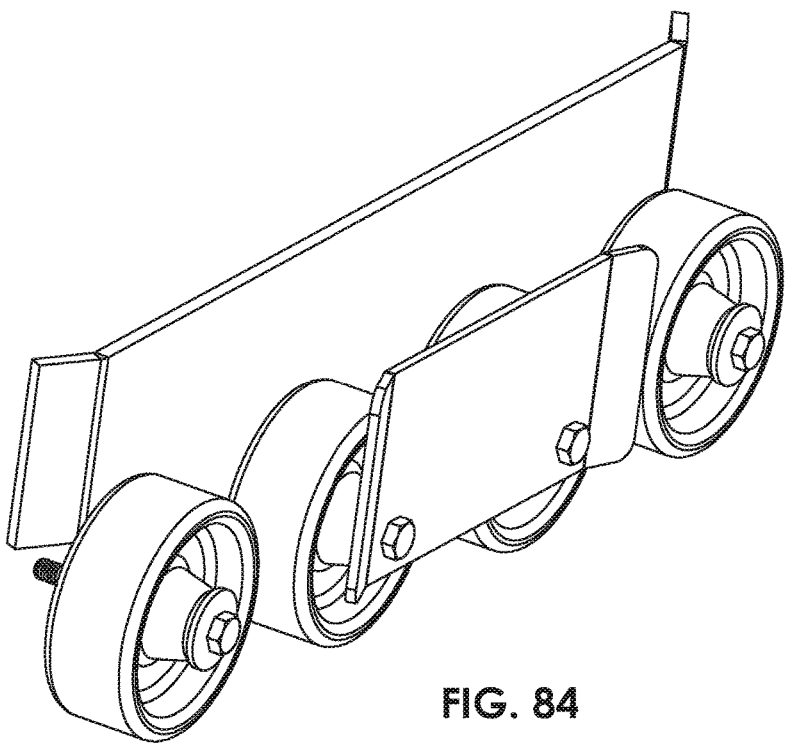

There are two or more panel support roller assemblies (SPS4) that mount to the bottom of the strut channel frame. These assemblies help support a wooden board and allow the wood to be pushed along the rollers so that an operator can position the board where the cut needs to be performed. These are shown in FIGS. 83 and 84

The center support guide (SPS5) is an additional support that is low in profile and clears the saw carriage when the saw carriage passes over the center support guide (SPS5)

Figure 80:
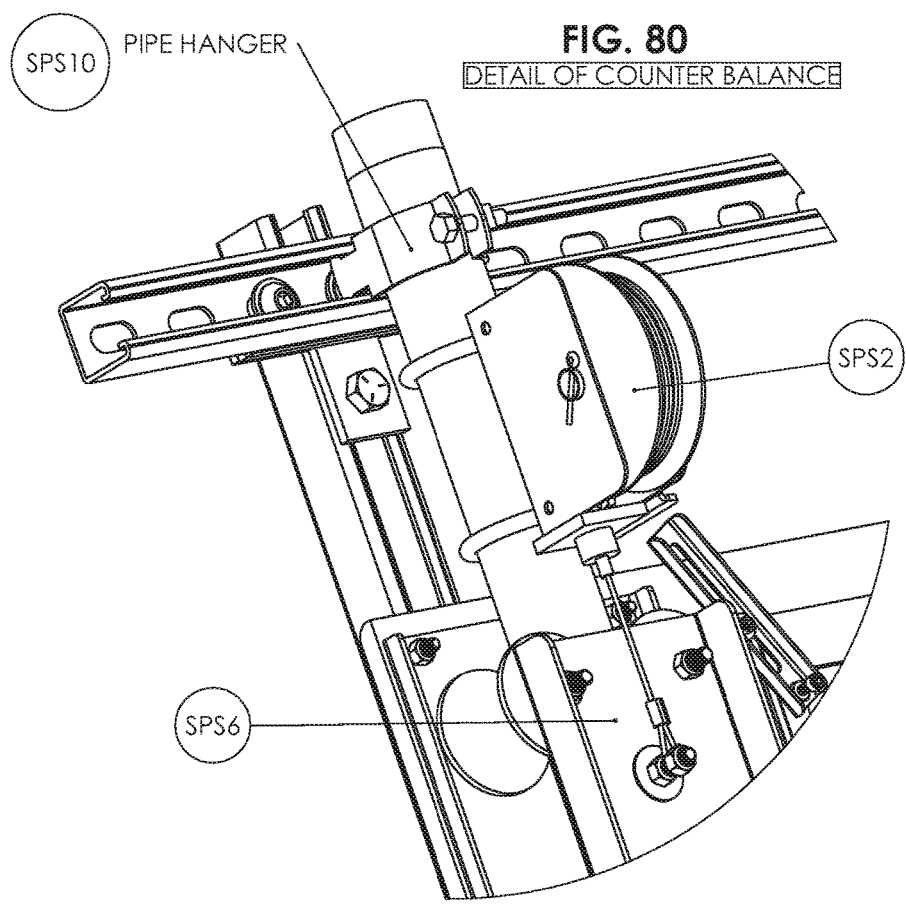
FIG. 80 shows a detail of the counter balance (SPS2) and how it is mounted to the guide shaft/pipe (SPS3) and to the saw carriage.

FIG. 80 shows a detail of the counter balance (SPS2) and how it is mounted to the guide shaft/pipe (SPS3) and to the saw carriage. The counter balance is a wrap spring/continuous force spring mechanism. A metal cable is wrapped around the spool of the mechanism. The end of the cable has a loop that hooks onto the roller mount cannel (SPS6). The guide shaft/pipe is mounted using standard pipe hangers (SPS10). The counter balance is mounted to the guide shaft/pipe using "U" bolts. This allows the operator to position the saw carriage and counter balance in the best position.

Figure 81:
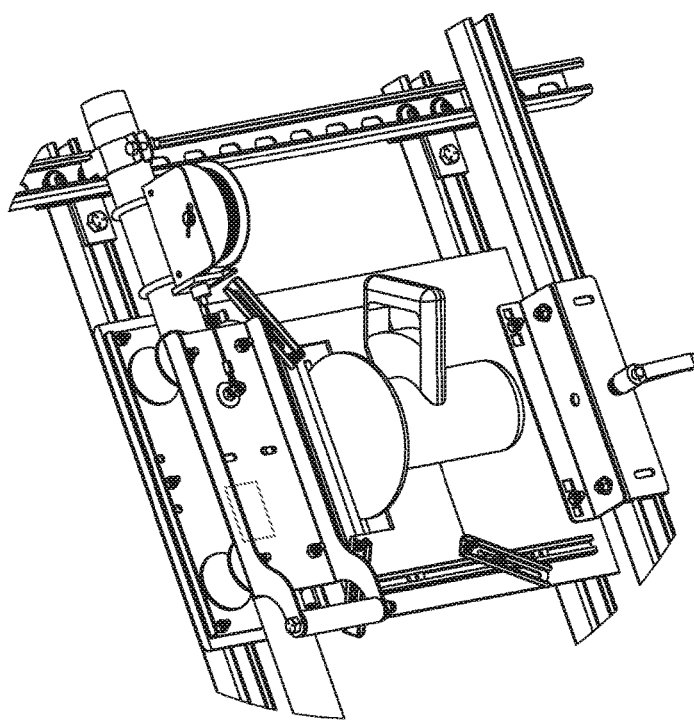
FIGS. 81 and 82 show details of the saw carriage of FIG. 79.

FIGS. 81 and 82 shows details of the saw carriage. The base of the carriage (SPS9) is made of wood which allows the operator to customize the carriage to suit his brand of hand circular saw. The upper and lower roller mount channels (SPS6) secure the "U" profile guide rollers (SPS7) and provides a rigid structure for mounting the wooden carriage base (SPS9). The upper roller mount plate has an integrated handle (SPS11) that the operator uses to pull the carriage down while making a saw cut. The side angle guide (SPS8) supports the end opposite the roller mount channel assembly. It also has a hand lock that allows the operator to lock the saw carriage in position if required.

FIGS. 83 and 84 show a detail of the panel support roller assembly. The wheels are mounted on a plate that has a bend on each end. These bends rest on the side of the strut channel that these assemblies mount to. The bends help carry the weight of the wooden boards as they rest of the support roller assemblies.

Operation:

The operator loads a wooden board/panel on the two roller support assemblies (SPS4). The board is positioned behind the guide shaft (SPS3) and saw carriage (SPS1). The operator then places his hand on the circular saw handle and turns on the saw. With one hand on the saw and the other pulling down on the roller support channel handle (SPS11), the saw is moved all the way down to the bottom of the support roller assemblies. Once passing the edge of the board where it makes contact with the rollers. The board then is cut. The operator then raises he saw carriage with the help of the counter balance (SPS2).

General Aspect 5: Strut Channel Folding bench

Figure 85:
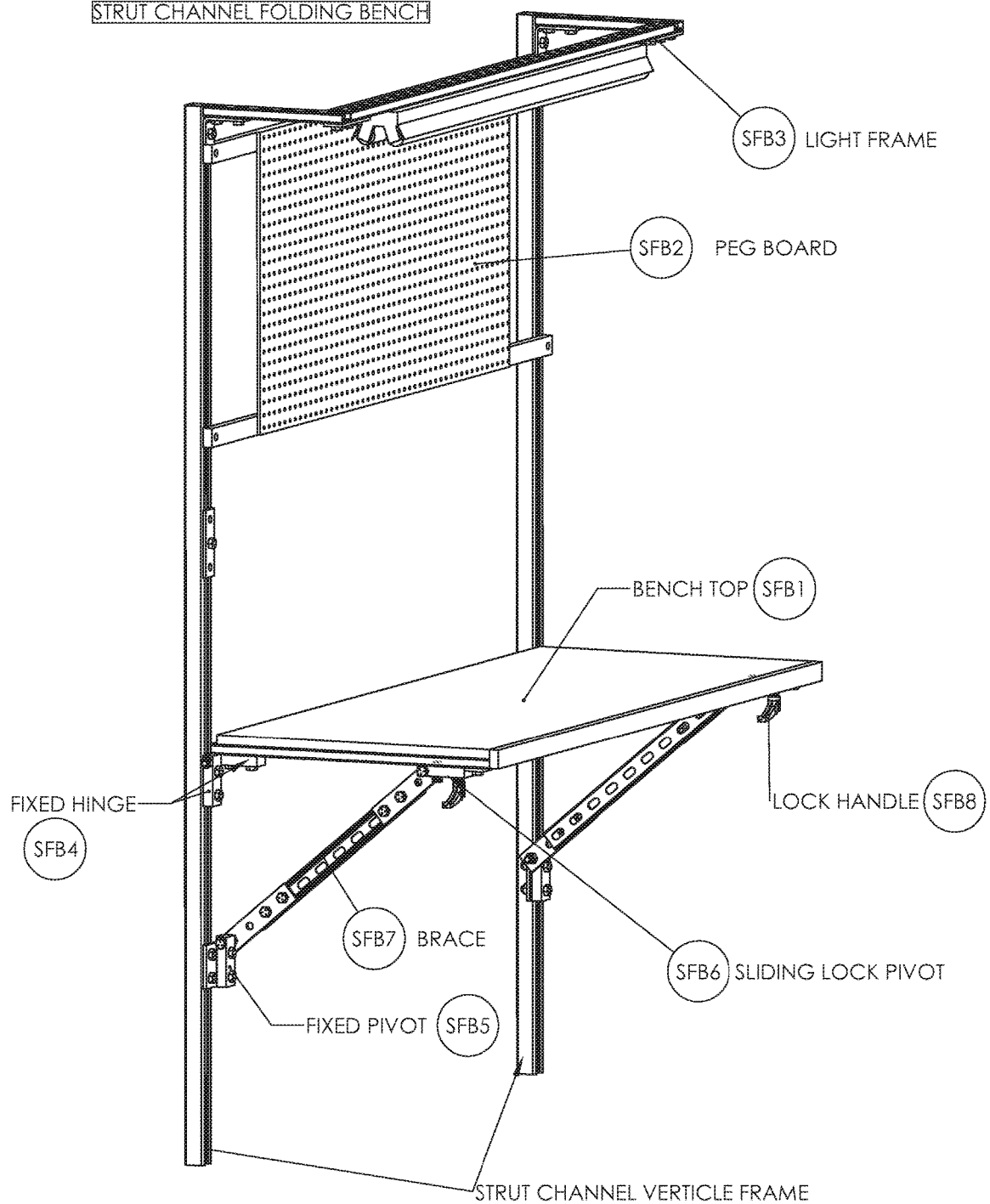
FIG. 85 is a strut channel folding bench shown in its folded "down" position.

Description:

FIG. 85 is the bench in its folded "down" position. The construction of this bench is primarily made from commercially available strut channel. Some of the manufactures of the strut channel and accessories are, but not limited to: Super Strut, Unistrut, B-Line and PHD. The advantage of using the strut channel components is that no welding is required and a person can simply bolt the pieces together using common tools. Both the channel and accessories are available in home improvements stores worldwide.

There can be many versions of this bench. In this version, there is a folding bench top (SFB1), a peg board to organize tools (SFB2) and a frame to mount a fluorescent light fixture (SFB3). All these components are made using strut channel and some custom parts.

The bench top in FIG. 85 pivots about a fixed hinge (SFB4) on either end of the top. Below this is a fixed pivot (SFB5) that mounts one end of the brace. The other end of the brace is secured to the sliding pivot lock (SFB6). This sliding lock is able to slide along the open side of the strut channel that is mounted to the bottom of the bench top on each side.

Figure 86:
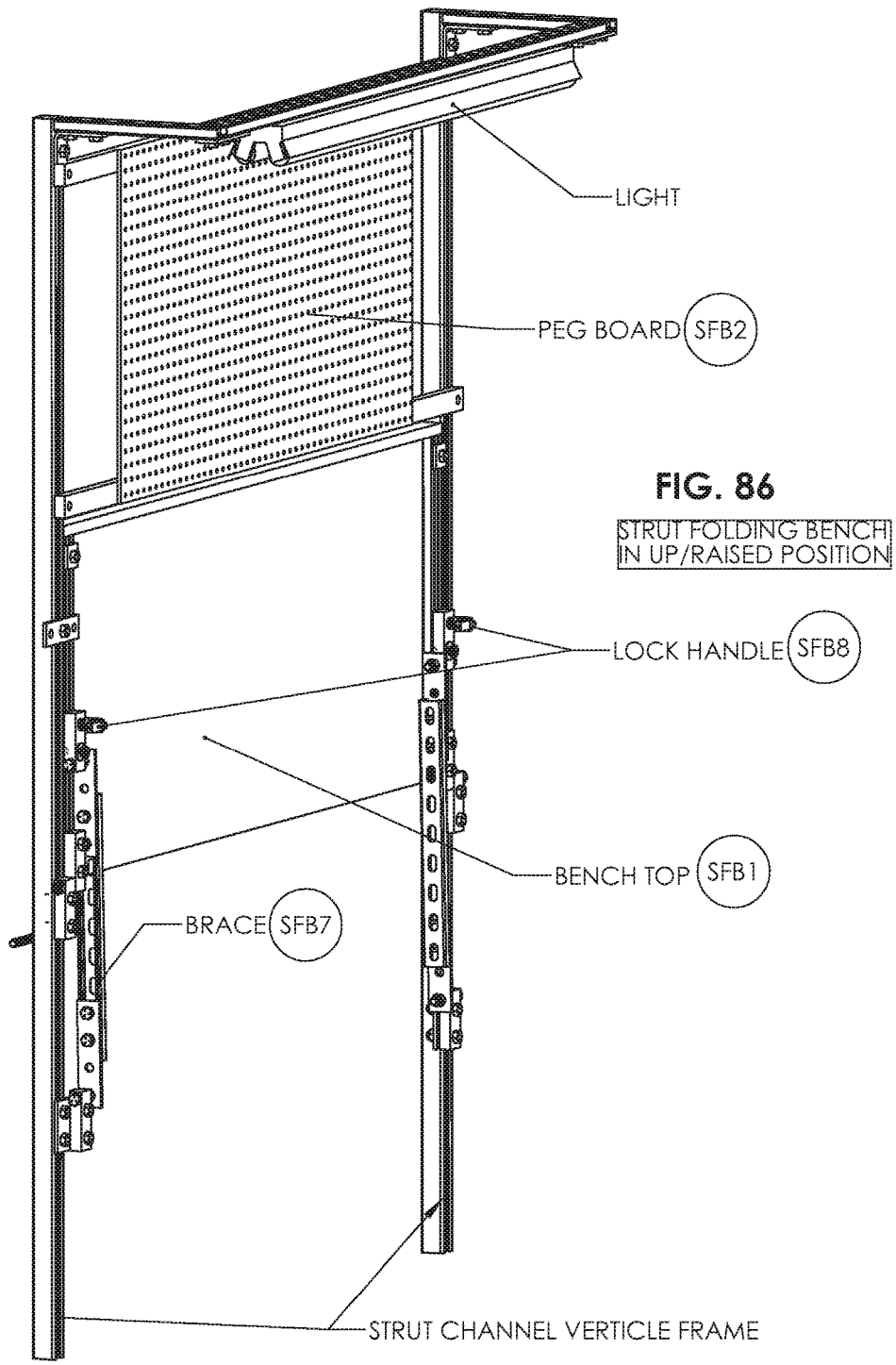
FIG. 86 is a view of the bench of FIG. 85 shown in its folded "up" position.

FIG. 86 is the bench in its folded "up" position. The bench top is folded up and rest in a position just below the peg board and even with the strut channel vertical frame.

Figure 87:
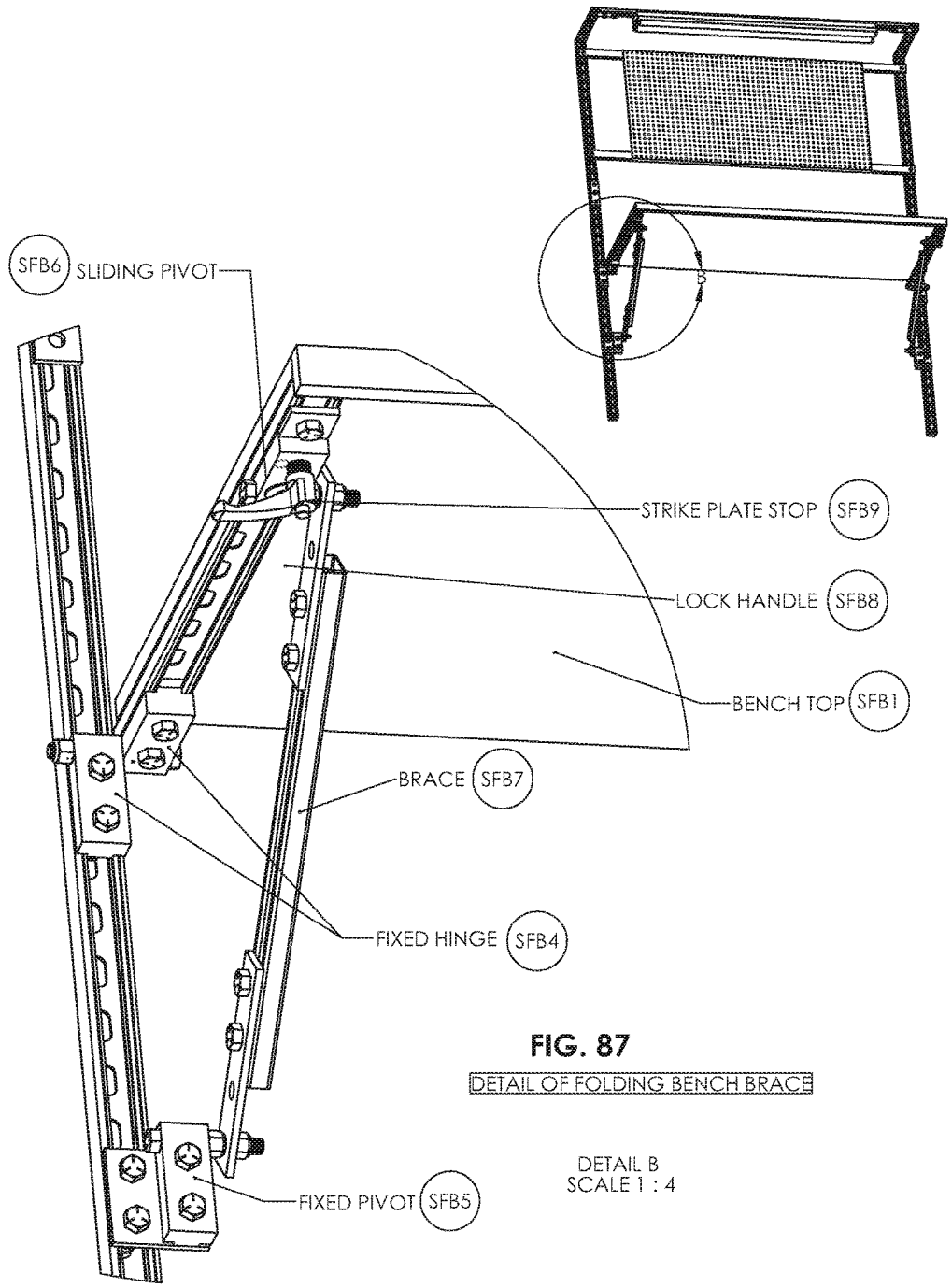
FIG. 87 shows a view looking under the bench top when the bench top is in its' folded down" position.

FIG. 87 shows a view looking under the bench top when the bench top is in its' folded down" position. A larger detail on the bottom of the page shows the orientation of the fixed hinge, fixed pivot and the brace (SFB7). The sliding pivot lock (SFB6) has a groove on the bottom of the block that keeps the block in line with the strut channel.

Operation:

The method of operation is very simple. The person loosens the two (SFB2) lock handles (SFB8) located under each end of the bench top. After each lock is released, the person lifts up the bench top (SFB1) (with 2 hands) in the center of the bench top. The bench top is raised and set in a position 90 degrees from its original position. The lock handles (SFB8) are then locked so that the bench does not drop back down to its "down" position. When in the "down" position, the sliding pivot locks rest against a strike plate stop (SFB9) (FIG. SFB-3). These take the force of the bench top when in the down position and also allows a person to adjust the stop position of the sliding pivot locks so to maintain a bench top position horizontal to the floor.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A clamp configured for operation while attached to an elongated structural member having a uniform cross sectional shape along its longitudinal axis, the clamp comprising:
   a clamp stop fixed to the structural member, the clamp stop including a stop surface at its proximal end that is substantially perpendicular to the longitudinal axis of the structural member; and
   a clamp block assembly comprising:
      a block housing slidably fixed to the structural member by an attachment mechanism that can be engaged to fix the block housing in place and disengaged to allow the block housing to slide along the longitudinal axis of the structural member while remaining attached thereto;
      a passage provided in the block housing and engaged with a shaft, so that the shaft is longitudinally fixed to the block housing when engaged therewith, but can be disengaged or otherwise manipulated for advancement and retraction through the passage; and
      a block surface fixed to a distal end of the shaft and substantially perpendicular to the longitudinal axis of the structural member, so that the block surface is in an opposed, parallel relationship to the stop surface when the shaft is parallel to the longitudinal axis of the structural member and the block surface is directed toward the clamp stop;
   the structural member being a strut channel having a cross sectional shape that includes a horizontal, flat bottom and vertical sides, the vertical sides having upper ends that extend horizontally inward without reaching a center thereof and then vertically downward without reaching the bottom, thereby forming an interior that is vertically open in a central region thereof but vertically blocked at both left and right sides thereof.

2. The clamp of claim 1, wherein the shaft is engaged with the passage by a ratchet or pawl mechanism.

3. The clamp of claim 1, wherein the shaft is a threaded shaft and the passage is a threaded passage, so that the shaft can be advanced and retracted through the threaded passage by rotation and counter-rotation of the threaded shaft, respectively.

4. The clamp of claim 3, wherein the threaded passage is elongated and threaded over only a partial circumference thereof, so that the threaded shaft can be disengaged from the threaded passage by a temporary, vertical displacement of the threaded passage, thereby allowing the threaded shaft to slide freely through the threaded passage.

5. The clamp of claim 1, wherein the block housing can be rotated about the attachment mechanism when the attachment mechanism is disengaged.

6. The clamp of claim 1, wherein a location of attachment of the clamp stop to the structural member can be selected from among a plurality of available attachment locations on the structural member.

7. The clamp of claim 1, wherein the attachment mechanism includes:
- a channel member that is inserted within the interior of the strut channel, said channel member being sufficiently wide to prevent vertical removal thereof while allowing the channel member to slide along the longitudinal axis of the strut channel;
- a threaded hole formed in a central region of the channel member; and
- a threaded rod, screw, or bolt that is engaged with the block housing and with the threaded hole in the channel member, so that tightening of the threaded rod, screw, or bolt causes the channel member to be pressed against the channel strut and to be frictionally fixed thereto.

8. The clamp of claim 1, wherein the block housing extends into the central region of the strut channel, thereby maintaining an alignment between the block housing and the longitudinal axis of the strut channel.

9. The clamp of claim 1, wherein the block housing extends downward along an outer surface of at least one of the sides of the strut channel, thereby maintaining an alignment between the block housing and the longitudinal axis of the strut channel.

10. The clamp of claim 1, wherein the strut channel is included in a product line of strut channels and other components that further includes accessories for interconnection of the strut channels in the product line.

11. The clamp of claim 10, wherein the clamp stop is a right-angle L-bracket selected from among the accessories included in the product line, the right-angle bracket being attached by at least one bolt or screw to at least one of a plurality of regularly spaced holes provided in the bottom of the strut channel.

12. The clamp of claim 10, wherein the block housing includes a pair of longitudinally spaced-apart L-brackets selected from among the accessories included in the product line and an engagement member that is penetrated by the passage, the engagement member begin sandwiched between upright ends of the spaced-apart L-brackets.

13. The clamp of claim 12, wherein the shaft is a threaded shaft and the engagement member is a quick nut, the threaded passage being elongated and threaded over only a partial circumference thereof, so that the threaded shaft can be disengaged from the threaded passage by a temporary, vertical displacement of the threaded passage, thereby allowing the threaded shaft to slide freely through the threaded passage.

14. The clamp of claim 1, wherein the clamp block is configured to position the shaft above the open central region of the strut channel.

15. The clamp of claim 1, wherein the clamp block is configured to position the shaft beside one of the sides of the strut channel.

\* \* \* \* \*